(12) United States Patent
Oh et al.

(10) Patent No.: US 9,864,544 B2
(45) Date of Patent: Jan. 9, 2018

(54) METHODS OF OPERATING MEMORY SYSTEMS FOR SUB-BLOCK ERASE OPERATION

(71) Applicants: Eun Chu Oh, Hwaseong-si (KR); Hong Rak Son, Anyang-si (KR); Jun Jin Kong, Yongin-si (KR); Seong Hyeog Choi, Hwaseong-si (KR)

(72) Inventors: Eun Chu Oh, Hwaseong-si (KR); Hong Rak Son, Anyang-si (KR); Jun Jin Kong, Yongin-si (KR); Seong Hyeog Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 51 days.

(21) Appl. No.: 15/001,275

(22) Filed: Jan. 20, 2016

(65) Prior Publication Data

US 2016/0210083 A1 Jul. 21, 2016

(30) Foreign Application Priority Data

Jan. 21, 2015 (KR) .......................... 10-2015-0010024

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0652* (2013.01); *G06F 3/064* (2013.01); *G06F 3/0614* (2013.01); *G06F 3/0673* (2013.01)

(58) Field of Classification Search
CPC ...... G06F 3/0614; G06F 3/064; G06F 3/0652; G06F 3/0673; H04N 5/23293; H04N 5/247
USPC .......................................... 711/103
See application file for complete search history.

(56) References Cited

U.S. PATENT DOCUMENTS

| 7,518,931 | B2 | 4/2009 | Shim |
| 7,804,718 | B2 | 9/2010 | Kim |
| 7,817,457 | B2 | 10/2010 | Tokiwa et al. |
| 8,654,580 | B2 * | 2/2014 | Kang ................. G11C 16/0483 365/185.03 |

(Continued)

FOREIGN PATENT DOCUMENTS

| KR | 10-0890045 | 3/2009 |
| KR | 10-2013-0042780 | 4/2013 |

*Primary Examiner* — Sheng-Jen Tsai
(74) *Attorney, Agent, or Firm* — Volentine & Whitt, PLLC

(57) ABSTRACT

A method of operating a memory system including memory blocks, each including memory cells and divided into at least first and second sub-blocks. The method includes performing a program operation on memory cells connected to at least one word line of the first and second sub-blocks using a first program method of programming data having a first number of bits, performing an erase operation on the first sub-block, and detecting a state of distribution of threshold voltages of memory cells of the first and second sub-blocks, and determining whether a program operation is to be performed on memory cells connected to a second adjacent word line including at least one word line adjacent to the first sub-block, out of the memory cells of the second sub-block, by using a second program method of programming data having a second number of bits, based on the detecting.

11 Claims, 36 Drawing Sheets

(56) References Cited

U.S. PATENT DOCUMENTS

| | | | |
|---|---|---|---|
| 8,792,272 B2* | 7/2014 | Bandic | G11C 13/0035 365/148 |
| 8,811,089 B2* | 8/2014 | Ueno | G11C 16/06 365/185.03 |
| 8,964,481 B2 | 2/2015 | Oh et al. | |
| 9,397,701 B1* | 7/2016 | Micheloni | H03M 13/13 |
| 9,589,673 B1* | 3/2017 | Zhang | G11C 29/50004 |
| 2005/0057995 A1* | 3/2005 | Mitani | G11C 11/56 365/222 |
| 2008/0117703 A1* | 5/2008 | Chen | G11C 7/14 365/210.1 |
| 2009/0168543 A1* | 7/2009 | Kim | G11C 16/26 365/185.29 |
| 2010/0103731 A1* | 4/2010 | Yoo | G11C 16/3427 365/185.02 |
| 2012/0140556 A1* | 6/2012 | Chen | G11C 11/5628 365/185.02 |
| 2012/0294092 A1* | 11/2012 | Cho | G11C 11/406 365/185.22 |
| 2013/0294166 A1* | 11/2013 | Ha | G11C 16/26 365/185.17 |
| 2014/0063938 A1* | 3/2014 | Oh | H01L 27/11524 365/185.02 |
| 2014/0133232 A1 | 5/2014 | Avila et al. | |
| 2014/0136765 A1 | 5/2014 | Oh et al. | |
| 2014/0281771 A1* | 9/2014 | Yoon | G06F 11/1068 714/721 |
| 2014/0281823 A1* | 9/2014 | Micheloni | G06F 11/1012 714/773 |
| 2015/0055411 A1* | 2/2015 | Kim | G11C 11/5628 365/185.02 |
| 2015/0131375 A1* | 5/2015 | Kwak | G11C 16/10 365/185.03 |
| 2016/0011818 A1* | 1/2016 | Hashimoto | G11C 16/3495 711/103 |
| 2016/0049192 A1* | 2/2016 | Lee | G11C 16/3427 365/185.03 |
| 2016/0180946 A1* | 6/2016 | Hong | G11C 16/26 365/185.11 |

* cited by examiner

METHODS OF OPERATING MEMORY SYSTEMS FOR SUB-BLOCK ERASE OPERATION

CROSS-REFERENCE TO RELATED APPLICATION

A claim of priority under 35 U.S.C. §119 is made to Korean Patent Application No. 10-2015-0010024, filed on Jan. 21, 2015, in the Korean Intellectual Property Office, the disclosure of which is incorporated herein in its entirety by reference.

BACKGROUND

The inventive concept herein relates to a memory device, and more particularly, to a method of operating a memory system, which may control a program method and a read method to increase data reliability.

Semiconductor memory devices may be memory devices that are embodied using semiconductors, such as silicon (Si), germanium (Ge), gallium arsenide (GaAs), or indium phosphide (InP). The semiconductor memory devices may generally be classified into volatile memory devices and non-volatile memory devices.

Volatile memory devices are memory devices that lose stored data when power supply is cut off. Volatile memory devices may include static RAM (SRAM), dynamic RAM (DRAM), and synchronous DRAM (SDRAM). In contrast, non-volatile memory devices are memory devices that retain stored data even after power supply is cut off. Non-volatile memory devices may include read-only memory (ROM), programmable ROM (PROM), electrically programmable ROM (EPROM), electrically erasable and programmable ROM (EEPROM), flash memory devices, phase-change RAM (PRAM), magnetic RAM (MRAM), resistive RAM (RRAM), and ferroelectric RAM (FRAM). Flash memory devices may be broadly divided into NOR type and NAND type.

Recent research has improved the integration density of semiconductor memory devices by adopting 3-dimensional array structures, and has suggested program methods and read methods of 3-dimensional memories.

SUMMARY

Embodiments of the inventive concept provide a method of operating a memory system including a plurality of memory blocks, each of which includes a plurality of memory cells and is divided into at least a first sub-block and a second sub-block. The method includes performing a program operation on memory cells connected to at least one word line of the first sub-block and the second sub-block with a first program method, wherein the first program method is configured to program each of the memory cells to have a first number of bits, performing an erase operation on the first sub-block, detecting a state of distribution of threshold voltages of a plurality of memory cells included in the second sub-block and determining whether a program operation on memory cells connected to a second adjacent word lines including at least one word line adjacent to the first sub-block is to be performed with a second program method based on the detecting result, and programming memory cells connected to the second adjacent word lines with the second program method, wherein the second program method is configured to program each of the memory cells to have a second number of bits.

The first number of bits may be more than the second number of bits.

The method may further include performing a program operation on memory cells connected to a first adjacent word line including at least one word line adjacent to the second sub-block with the second program method.

The method may further include determining whether a program operation is to be performed on the memory cells connected to the second adjacent word lines with the second program method, after an erase operation is performed on the second sub-block and before a program operation is performed on the memory cells connected to the at least one word line of the second sub-block.

The determination of whether the program operation is to be performed on the memory cells connected to the second adjacent word lines with the second program method may include applying a detection voltage to the memory cells connected to the second adjacent word line, on which the program operation is performed by using the first program method, and detecting off-cells having threshold voltages that are higher than the detectable voltage, from among the memory cells connected to the second adjacent word line, and setting a program operation to be performed on the memory cells connected to the second adjacent word line with the second program method when a number of detected off-cells is less than a reference value.

The second sub-block may further include a dummy word line connected to a plurality of memory cells. The method may further include programming part of data to be programmed in the second sub-block, in memory cells connected to the dummy word line.

The first number of bits may be equal to the second number of bits, and the second program method may include boosting threshold voltages of the memory cells connected to the second adjacent word line to be higher than in the first program method.

The second program method may include applying a program voltage having a higher voltage level than in the first program method to at least one of the memory cells during the program operation.

Each of the first program method and the second program method may be an incremental step pulse programming (ISPP) method by which a program voltage is gradually increased by as much as a predetermined step voltage.

In the second program method, at least one of the step voltages and/or pulse application periods may be greater than in the corresponding step voltages and/or pulse application periods of the first program method.

The second program method may be a method of programming data after an error correction code (ECC) operation by setting a unit of ECC data to be larger than in the first program method, or the second program may be a method of programming data after an ECC encoding operation performing a larger number of times than in the first program method.

Embodiments of the inventive concept also provide a method of operating a memory system including a plurality of memory blocks, each of which comprises a plurality of memory cells vertically stacked on a substrate and is divided into at least a first sub-block and a second sub-block. The method includes performing a read operation on memory cells connected to at least one word line of the first sub-block with a first read method, and performing a read operation on memory cells connected to at least one word line of the second sub-block, which is adjacent to the first sub-block with a second read method.

The second read method may include applying a read voltage having a smaller magnitude than in the first read method, to read memory cells in which the same data is programmed.

The second read method may be a soft decision read method including performing a read operation at least twice and includes performing a larger number of read operations than in the first read method.

The method may further include determining whether a read operation is to be performed on the memory cells connected to the at least one word line of the second sub-block, which is adjacent to the first sub-block, by using the second read method. When the first sub-block is partially erased in units of sub-blocks, it is determined that a read operation is to be performed using the second read method on memory cells connected to at least one word line of the second sub-block, which is adjacent to the first sub-block.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
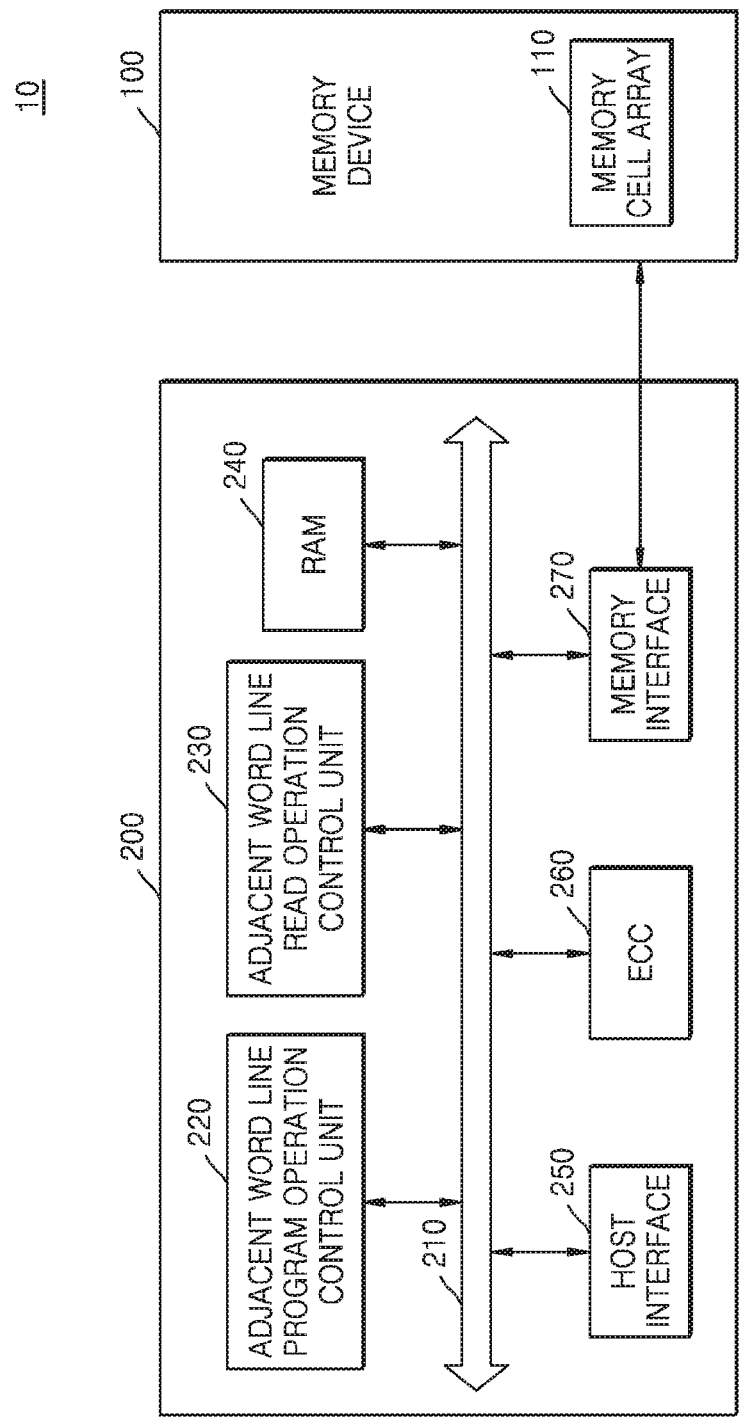
FIG. 1 illustrates a block diagram of a memory system according to an exemplary embodiment of the inventive concept.

As used herein, the term "and/or" includes any and all combinations of one or more of the associated listed items. Expressions such as "at least one of," when preceding a list of elements, modify the entire list of elements and do not modify the individual elements of the list.

The inventive concept will now be described more fully hereinafter with reference to the accompanying drawings, in which exemplary embodiments of the inventive concept are shown. These embodiments are provided so that this disclosure is thorough and complete and fully conveys the scope of the inventive concept to one skilled in the art. Accordingly, while the inventive concept can be modified in various ways and take on various alternative forms, specific embodiments thereof are shown in the drawings and described in detail below as examples. There is no intent to limit the inventive concept to the particular forms disclosed. On the contrary, the inventive concept is to cover all modifications, equivalents, and alternatives falling within the spirit and scope of the appended claims. Like reference numerals refer to like elements throughout.

The terminology used herein is for the purpose of describing particular embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a memory system 10 according to an exemplary embodiment of the inventive concept.

Referring to FIG. 1, the memory system 10 includes a memory device 100 and a memory controller 200. The memory device 100 includes a memory cell array 110. The memory controller 200 includes an internal bus 210, an adjacent word line program operation control unit 220, an adjacent word line read operation control unit 230, a random access memory (RAM) 240, a host interface 250, an error correction code (ECC) block 260, and memory interface 270.

Figure 2:
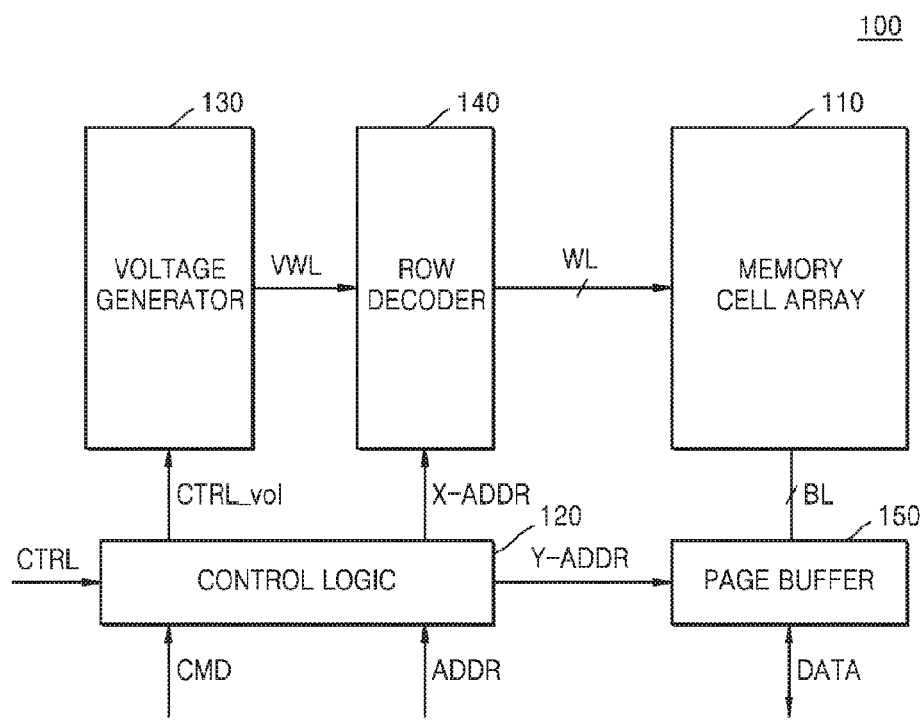
FIG. 2 illustrates a detailed block diagram of a memory device included in the memory system of FIG. 1, according to an exemplary embodiment of the inventive concept.

The memory cell array 110 may include a plurality of cells (not shown) disposed at intersections between a plurality a plurality of word lines (WL in FIG. 2) and a plurality of bit lines (BL in FIG. 2). In an embodiment, the plurality of memory cells may be flash memory cells, and the memory cell array 110 may be a NAND flash memory cell array or a NOR flash memory cell array.

Hereinafter, exemplary embodiments of the inventive concept will be described for the case that the plurality of memory cells are NAND flash memory cells. For example, the plurality of memory cells may be NAND flash memory cells, which may have a 2-dimensional horizontal structure as disclosed in FIG. 4. In another example, the plurality of memory cells may be 3-dimensional vertical NAND (3D VNAND) flash memory cells as disclosed in FIGS. 5 and 6. However, the inventive concept is not limited thereto. In other embodiments, the plurality of memory cells may be resistive memory cells, such as resistive RAM (RRAM) memory cells, phase-change RAM (PRAM) memory cells, or magnetic RAM (MRAM) memory cells.

The memory cell array 110 may be divided into a plurality of memory groups, and each of the plurality of memory groups may include a plurality of memory cells. The plurality of memory groups may be divided into one of memory blocks, word lines, pages, and dies. However, the inventive concept is not limited thereto, and the memory groups may be divided into arbitrary program units.

Each of the memory cells included in the memory cell array 110 may be one of a single-level cell (SLC) configured to store 1-bit data, a multi-level cell (MLC) configured to store 2-bit data, and a triple-level cell (TLC) configured to store 3-bit data. However, the inventive concept is not limited thereto. In other embodiments, each of the memory cells included in the memory cell array 110 may store data with 4 bits or more.

The memory controller 200 may be connected to a host Host and the memory device 100. In response to a request from the host Host, the memory controller 200 may be configured to access the memory device 100. For example, the memory controller 200 may be configured to control a program operation, a read operation, an erase operation, and a background operation of the memory device 100. In particular, the memory controller 200 may control a 3D VNAND flash memory to perform an erase operation in units of sub-blocks. The memory controller 200 may be configured to provide an interface between the memory device 100 and the host Host. The memory controller 200 may be configured to drive firmware capable of controlling the memory device 100.

The internal bus 210 of the memory controller 200 may provide channels between elements of the memory controller 200.

When the memory device 100 is a 3D VNAND flash memory and performs an erase operation in units of sub-blocks, the adjacent word line program operation control unit 220 may control a program operation on adjacent word lines of the erased sub-blocks.

When the memory device 100 is the 3D VNAND flash memory and performs the erase operation in the units of sub-blocks, the adjacent word line read operation control unit 230 may control a read operation on adjacent word lines of the erased sub-blocks.

The volatile memory RAM 240 may be used as at least one of an operation memory for the adjacent word line program operation control unit 220 and the adjacent word line read operation control unit 230, a cache memory between the memory device 100 and the host Host, and a buffer memory between the memory device 100 and the host Host.

The host interface 250 may include a protocol configured to exchange data between the host Host and the memory controller 200. The host interface 250 may communicate with an external device (e.g., the host Host) via at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA (SATA) protocol, a parallel-ATA (PATA) protocol, a small computer small interface (SCSI) protocol, an enhanced small disk interface (ESDI) protocol, and an integrated drive electronics (IDE) protocol, or the like.

The ECC block 260 performs error correction operation with error correction codes ECCs. The ECC block 260 may encode data using the ECCs and program the encoded data in the memory device 100. The adjacent word line program operation control unit 220 may control the programming of the data by changing the unit of ECC encoding data or performing an ECC encoding operation a plurality of times by using the ECC block 260 in response to data to be programmed in adjacent word lines of a sub-block that is erased in units of sub-blocks. The adjacent word line program operation control unit 220 may be configured to detect and correct errors in data read from the memory device 100. The memory interface 270 may interface with the memory device 100. For example, the memory interface 270 may include a NAND interface or a NOR interface.

The memory controller 200 and the memory device 100 may be integrated into one semiconductor device. For example, the memory controller 200 and the memory device 100 may be integrated into one semiconductor device and constitute a memory card, such as a personal computer (PC) card (e.g., personal computer memory card international association (PCMCIA)), a compact flash card (CF), a smart media card (SM or SMC), a memory stick, a multimedia card (MMC) (e.g., a reduced-size MMC (RS-MMC) and an MMCmicro), a secure digital (SD) card (e.g., miniSD, microSD, and SDHC), and a universal flash storage (UFS), or the like.

The memory controller 200 and the memory device 100 may be integrated into one semiconductor device and constitute a semiconductor drive (e.g., solid-state drive SSD). The semiconductor drive may include a storage configured to store data in a semiconductor memory. When the memory system 10 is used as the semiconductor drive (e.g., the SSD), an operating speed of the host Host connected to the memory system 10 may be improved.

The memory system 10 may be provided as one of various elements of an electronic device, for example, a computer, an ultra-mobile PC (UMPC), a work station, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a digital multimedia broadcasting (DMG) player, a 3D television, a digital audio recorder, a digital audio player, a digital picture recorder, a digital picture player, a digital video recorder, a digital video player, a storage for a data center, a device capable of transmitting and receiving information in wireless environments, one of various electronic devices of a home network, one of various electronic devices of a computer network, one of various electronic devices of a telematics network, a radio-frequency identification (RFID) device, or one of various elements of a computing system.

The memory device 100 or the memory system 10 may be mounted in packages having various shapes. For example, the memory device 100 or the memory system 10 may be packaged and mounted using a Package on Package (PoP) technique, a ball grid array (BGA) technique, a chip-scale package (CSP) technique, a plastic-leaded chip carrier (PLCC) technique, a plastic dual in-line package (PDIP) technique, a die-in-waffle-pack technique, a die-in-wafer-form technique, a chip-on-board (COB) technique, a ceramic dual in-line package (CERDIP) technique, a plastic metric quad flat-pack (MQFP) technique, a thin quad flat-pack (TQFP) technique, a small outline (SOIC) technique, a shrink small outline package (SSOP) technique, a thin small outline (TSOP) technique, a thin quad flatpack (TQFP) technique, a system-in-package (SIP) technique, a multi-chip package (MCP) technique, a wafer-level fabricated package (WFP) technique, or a wafer-level processed stack package (WSP) technique, or the like.

FIG. 2 illustrates a detailed block diagram of an example of the memory device 100 included in the memory system 100 of FIG. 1.

Referring to FIG. 2, the memory device 100 includes a memory cell array 110, a control logic 120, a voltage generator 130, a row decoder 140, and a page buffer 150. Although not shown, the memory device 100 may further include an input/output (I/O) circuit or an I/O interface.

The memory cell array 110 may be connected to a plurality of word lines WL and a plurality of bit lines BL. Although not shown, the memory cell array 110 may be connected to at least one string selection line SSL and at least one ground selection line GSL. The memory cell array 110 may include a plurality of memory cells MCs disposed at intersections between a plurality of word lines WL and a plurality of bit lines BL. Each of the plurality of memory cells may store 1-bit data or multi-bit data.

When an erase voltage is applied to the memory cell array 110, the plurality of memory cells MC may be changed into an erase state. When a program voltage is applied to the memory cell array 110, the plurality of memory cells MCs may be changed into one of program states. Each of the memory cells MCs may have an erase state E or one of program states which are distinguished from each another according to threshold voltage Vth.

When the memory cell MC is a single-level cell, the memory cell MC may have an erase state E or a program state P. When the memory cell MC is a multi-level cell, the memory cell MC may have one of first to n-th program states P1 to Pn, and n may be a natural number equal to or more than 3. For example, when the memory cell MC is a multi-level cell, n may be 3. In another example, when the memory cell MC is a triple-level cell, n may be 7.

The memory cell array 110 may include at least one of a single-level cell block including single-level cells, a multi-level cell block including multi-level cells, and a triple-level cell block including triple-level cells. In other words, some of the plurality of memory blocks included in the memory cell array 110 may be single-level cell blocks, and other memory blocks thereof may be multi-level cell blocks or triple-level cell blocks.

The control logic 120 may output various control signals to write data to the memory cell array 110 or read data from the memory cell array 110 based on a command CMD, an address ADDR, and a control signal CTRL received from the memory controller 200. Thus, the control logic 120 may generally control various operations in the memory device 100.

The control logic 120 may provide various control signals to the voltage generator 130, the row decoder 140, and the page buffer 150. Specifically, the control logic 120 may provide a voltage control signal CTRL_vol to the voltage generator 130, provide a row address X_ADDR to the row decoder 140, and provide a column address Y_ADDR to the page buffer 150. However, the inventive concept is not limited thereto, and the control logic 120 may further provide other control signals to the voltage generator 130, the row decoder 140, and the page buffer 150.

The voltage generator 130 may generate several voltages for a program operation, a read operation, and an erase operation on the memory cell array 110 in response to the voltage control signal CTRL_vol. Specifically, the voltage generator 130 may generate a word line driving voltage VWL for driving a plurality of word lines WL. The first driving voltage VWL may be a program voltage (or a write voltage), a read voltage, an erase voltage, an inhibition voltage, or a program verification voltage. Although not shown, the voltage generator 130 may further generate a string selection line driving voltage VSSL for driving a plurality of string selection lines SSL and a ground selection line driving voltage VGSL for driving a plurality of ground selection lines GSL.

The row decoder 140 may be connected to the memory cell array 110 through a plurality of word lines WL, and enable some of the plurality of word lines WL in response to the row address X_ADDR received from the control logic 120. Specifically, in a read operation, the row decoder 140 may apply a read voltage to a selected word line, and apply an inhibition voltage to an unselected word line. Also, in a program operation, the row decoder 140 may apply a program voltage to a selected word line, and apply an inhibition voltage to an unselected word line.

The page buffer 150 may be connected to the memory cell array 110 through a plurality of bit lines BL. Specifically, in a read operation, the page buffer 150 may operate as a sense amplifier and output data DATA stored in the memory cell array 110. The page buffer 150 may also operate as a write driver and store desired data DATA in the memory cell array 110 during a program operation.

Figure 3:
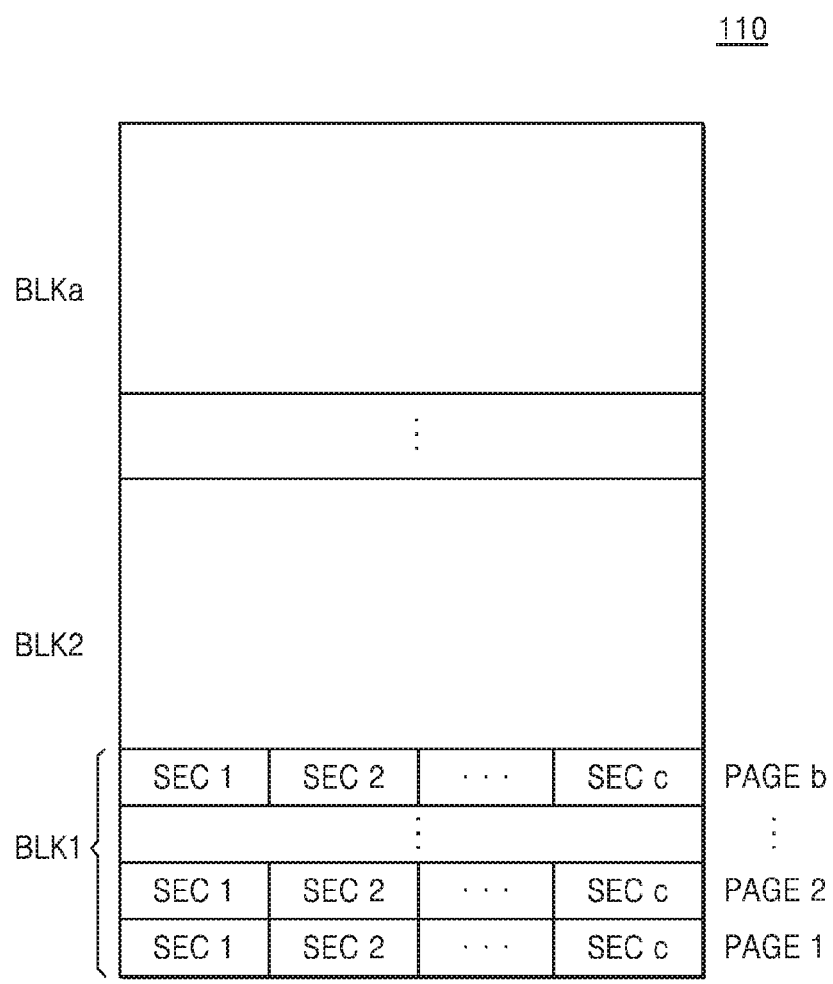
FIG. 3 illustrates a diagram of a memory cell array included in the memory device of FIG. 2, according to an exemplary embodiment of the inventive concept.

FIG. 3 illustrates a diagram of an example of the memory cell array 110 included in the memory device 100 of FIG. 2.

Referring to FIG. 3, the memory cell array 110 may be a flash memory cell array. In this case, the memory cell array 110 may include a (a is an integer equal to or more than 2) memory blocks BLK1 to BLKa, each of the memory blocks BLK1 to BLKa may include b (b is an integer equal to or more than 2) pages PAGE1 to PAGEb, each of the pages PAGE1 to PAGEb may include c (c is an integer equal to or more than 2) sectors SEC1 to SECc. Although FIG. 3 illustrates the pages PAGE1 to PAGEb and the sectors SEC1 to SECc included in only a first memory block BLK1, each of the other memory blocks BLK2 to BLKa may have the same structure as the block BLK1.

Figure 4:
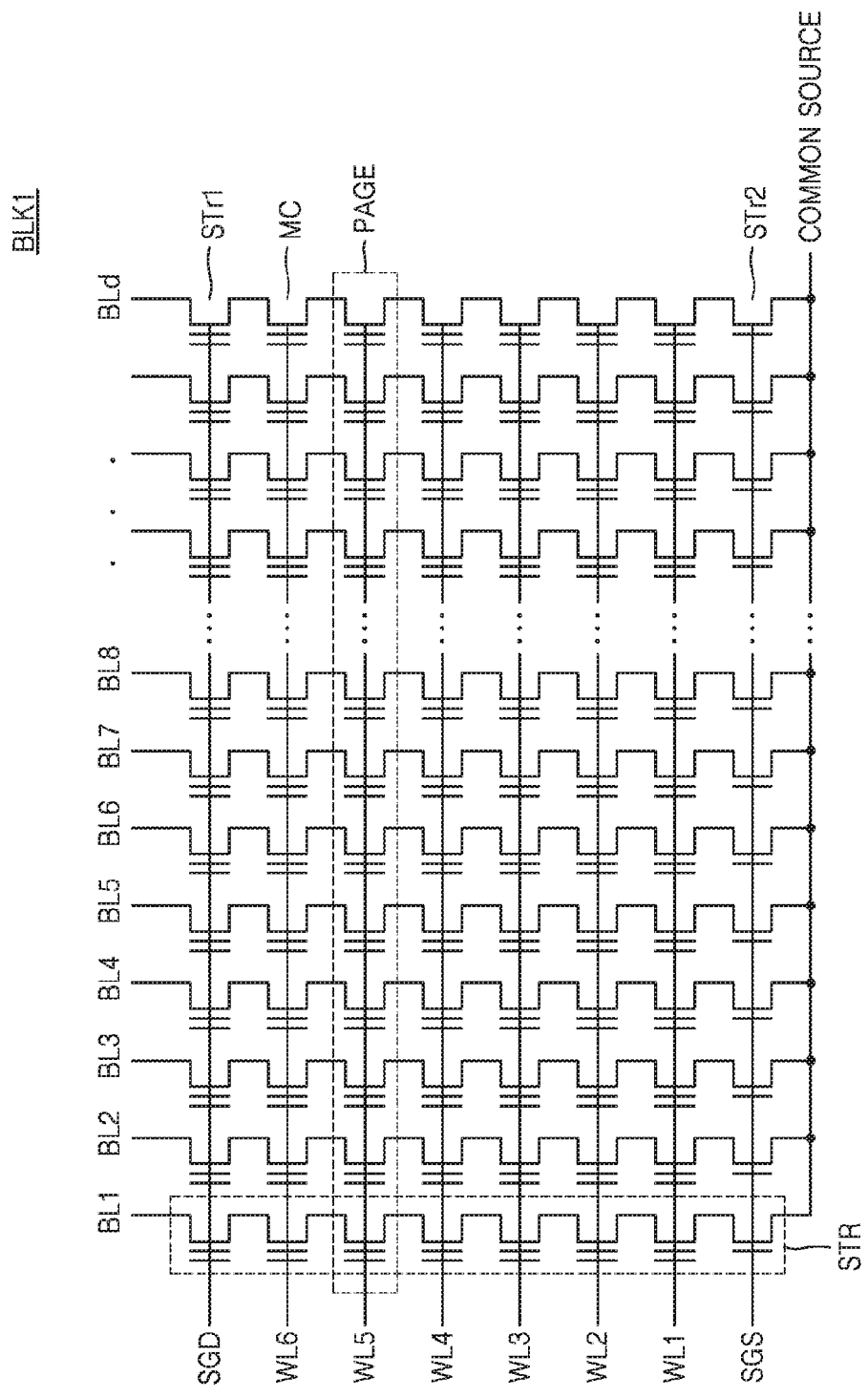
FIG. 4 illustrates a circuit diagram of a memory block included in the memory cell array of FIG. 3, according to an exemplary embodiment of the inventive concept.

FIG. 4 illustrates a circuit diagram of the first memory block BLK1 included in the memory cell array 110 of FIG. 3, according to an exemplary embodiment of the inventive concept.

Referring to FIG. 4, the first memory block BLK1 may be a horizontal NAND flash memory. Each of the memory blocks BLK1 to BLKa shown in FIG. 3 may be embodied as shown in FIG. 4. The first memory block BLK1 may include, for example, d (d is an integer equal to or more than 2) strings STR, each of which may include 8 memory cells connected in series. Each of the strings STR may include a drain selection transistor STr1 and a source selection transistor Str2, which may be connected to both ends of the serially connected memory cells MC. Here, the number of strings STR, the number of word lines WL, and the number of bit lines BL may be changed depending on memory capacities and technologies.

The NAND flash memory device having the structure shown in FIG. 4 may perform an erase operation in units of memory blocks, and perform a program operation in unit of pages PAGE. For example, when the memory cell MC is a single-level cell, one page PAGE may correspond to each of the word lines WL1 to WL6. In another example, when the memory cell MC is a multi-level cell or a triple-level cell, a plurality of pages PAGE may correspond to each of the word lines WL1 to WL6.

Figure 5:
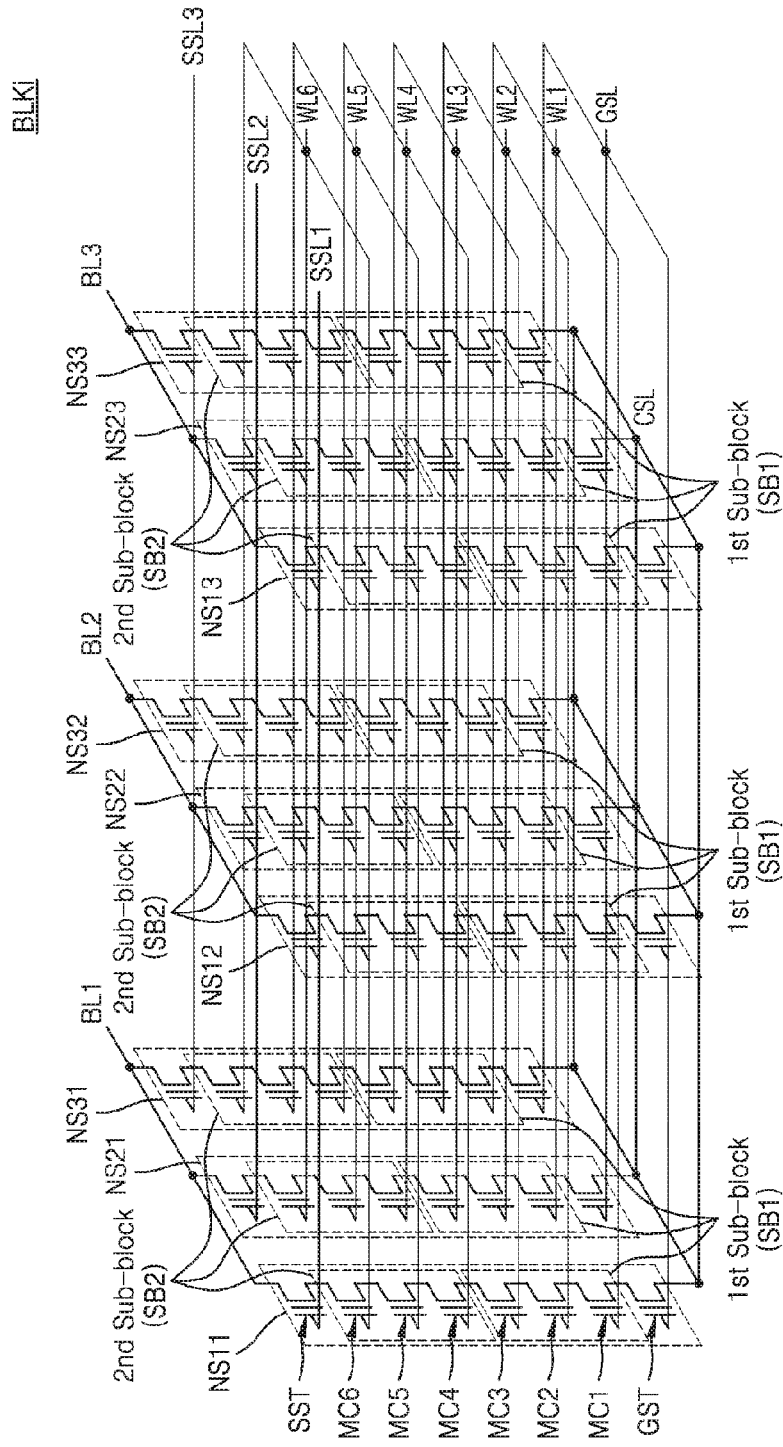
FIG. 5 illustrates a circuit diagram of the memory block included in the memory cell array of FIG. 3, according to an exemplary embodiment of the inventive concept.

FIG. 5 illustrates a circuit diagram of a first memory block BLK' included in the memory cell array of FIG. 3, according to another exemplary embodiment of the inventive concept.

Referring to FIG. 5, a first memory block BLK1' may be a VNAND flash memory, and each of the memory blocks BLK1 to BLKa shown in FIG. 3 may be embodied as shown in FIG. 5. The first memory block BLK1' may include a plurality of NAND strings NS11 to NS33, a plurality of word lines (e.g., WL1 to WL6), a plurality of bit lines (e.g., BL1 to BL3), ground selection lines GSL, a plurality of string selection lines (e.g., SSL1 to SSL3), and a common source line CSL. Here, the number of NAND strings, the number of word lines, the number of bit lines, the number of ground selection lines, and the number of string selection lines may be changed depending on memory capacities and technologies.

The NAND strings NS11 to NS33 may be connected between the bit lines BL1 to BL3 and the common source line CSL. Each of the NAND strings (e.g., NS11) may include a string selection transistor SST, a plurality of memory cells (e.g., MC1 to MC6), and a ground selection transistor GST, which may be connected in series. First to third memory cells MC1 to MC3 may constitute a first sub-block SB1, and fourth to sixth memory cells MC4 to MC6 may constitute a second sub-block SB2.

The string selection transistors SST may be connected to the string selection line SSL1 to SSL3. The memory cells MC1 to MC6 may be respectively connected to the corresponding word lines WL1 to WL6. The ground selection transistors GST may be connected to the ground selection lines GSL. The string selection transistors SST may be connected to the corresponding bit line BL, and the ground selection transistors GST may be connected to the common source line CSL.

Word lines (e.g., WL1) formed at the same level may be connected in common, and the string selection lines SSL1 to SSL3 may be separated from one another. When memory cells that are connected to the first word line WL1 and belong to the NAND strings NS11, NS12, and NS13 are programmed, the first word line WL1 and the first string selection line SSL1 may be selected. A second adjacent word line refers to a word line that is included in the second sub-block SB2 and adjacent to the first sub-block SB1. In an embodiment, the second adjacent word line may be a fourth word line WL4. However, the inventive concept is not limited thereto, and a fifth word line WL5 may be the second adjacent word line. A first adjacent word line refers to a word line that is included in the first sub-block SB1 and adjacent to the 2 sub-block SB2. However, the inventive concept is not limited thereto, and a second word line WL2 may be the first adjacent word line.

Figure 6A:
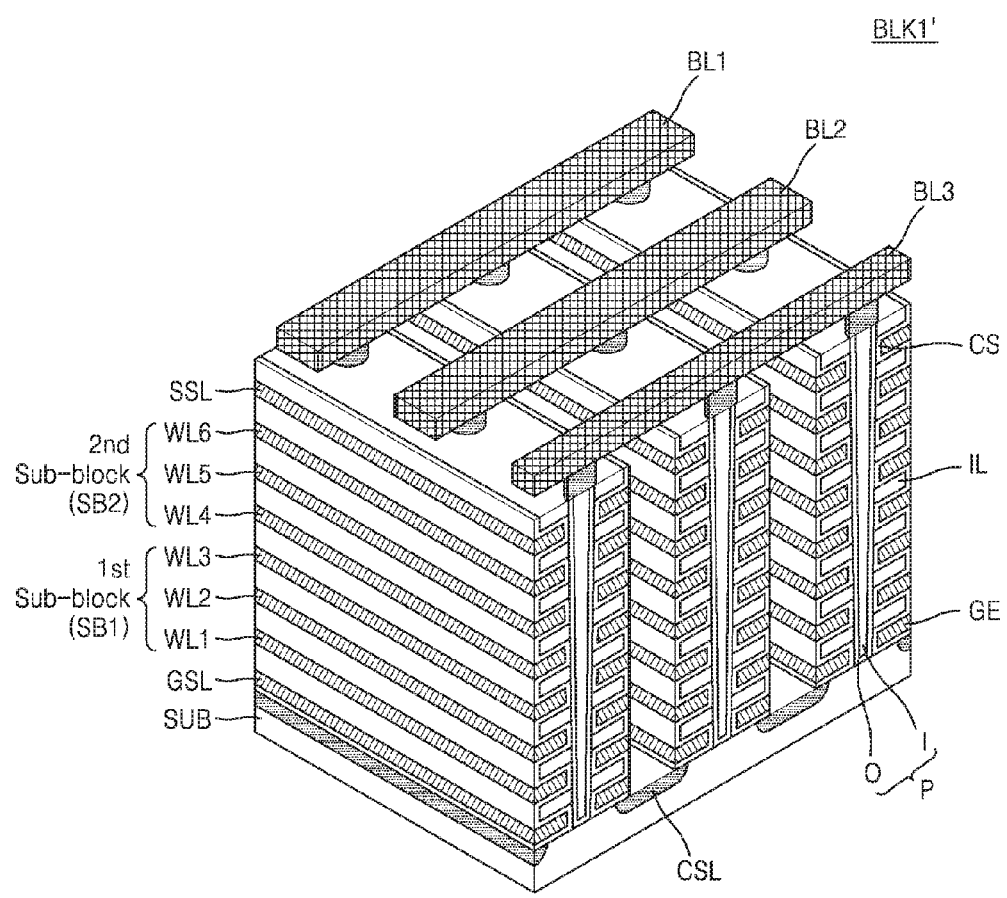
FIGS. 6A and 6B illustrate perspective views of memory blocks corresponding to the circuit diagram of FIG. 5, according to exemplary embodiments of the inventive concept.

FIG. 6A illustrates a perspective view of the memory block BLK1' corresponding to the circuit diagram of FIG. 5.

Referring to FIG. 6A, the first memory block BLK1' may be formed in a vertical direction to a substrate SUB. A common source line CSL may be disposed on the substrate SUB, and a plurality of gate electrodes GE and a plurality of insulating layers IL may be alternately stacked on the substrate SUB. Also, a charge storage layer CS may be formed between the gate electrode GE and the insulating layer IL.

When the plurality of gate electrodes GE and the plurality of insulating layers IL that are alternately stacked may be vertically patterned, V-shaped pillars P may be formed. Each of the pillars P may penetrate the gate electrodes GE and the insulating layers IL and be connected to the substrate SUB. An outer portion O of each of the pillars P may be formed of a semiconductor material and function as a channel region. An inner portion I of each of the pillars P may be formed of an insulating material, such as silicon oxide.

The gate electrodes GE of the memory block BLK1' may be respectively connected to the ground selection line GSL, the word lines WL1 to WL6, and the string selection line SSL. Also, the pillars P of the memory block BLK1' may be connected to the bit lines BL1 to BL3. Also, the first to third word lines WL1 to WL3 may constitute a first sub-block SB1, and the fourth to sixth word lines WL4 to WL6 may constitute a second sub-block SB2. FIG. 6A illustrates an example in which the first memory block BLK1' includes two selection lines GSL and SSL, six word lines WL1 to WL6, and three bit lines BL1 to BL3, but the inventive concept is not limited thereto, and the first memory block BLK1' may include more or fewer selection lines, more or fewer word lines, and more or fewer bit lines.

Figure 6B:
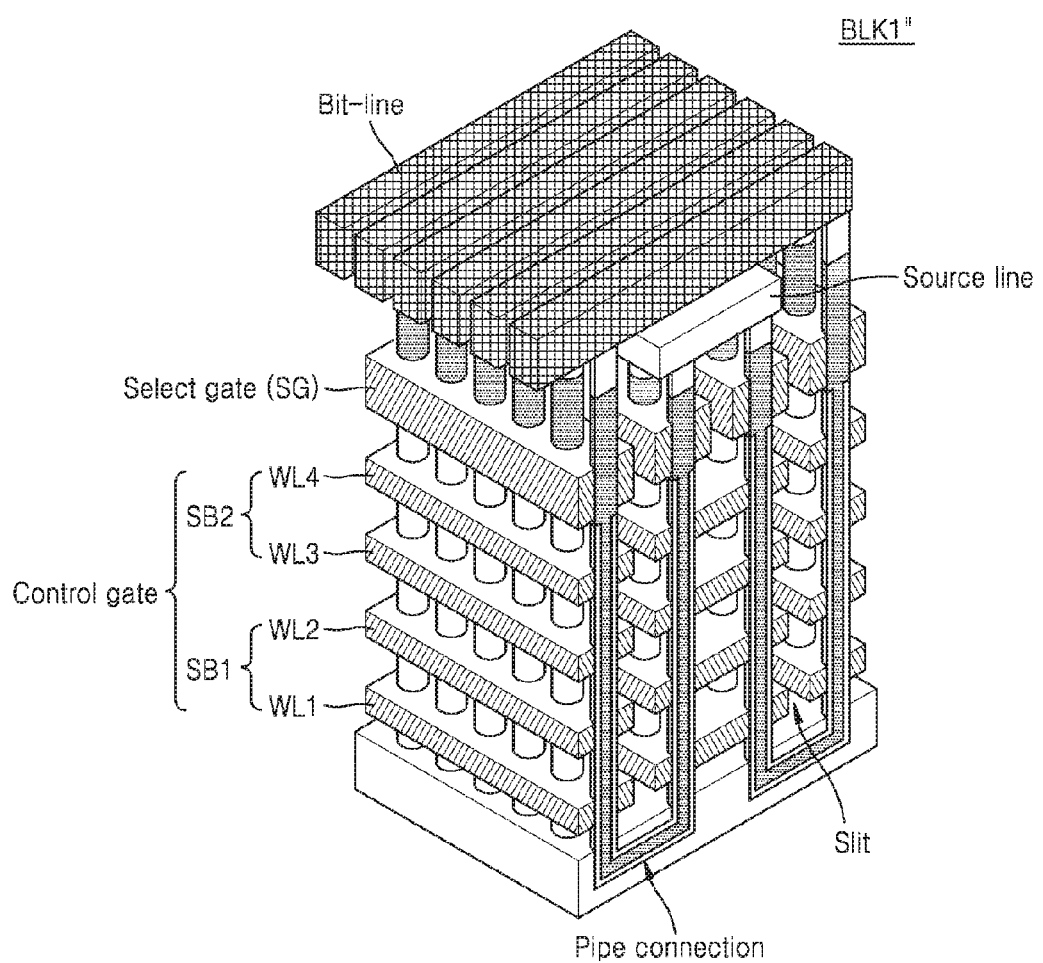

FIG. 6B illustrates a perspective view of a memory block BLK1" corresponding to the circuit diagram of FIG. 5.

FIG. 6B illustrates a first memory block BLK1" corresponding to a pipe-shaped Bit Cost Scalable (P-BiCS) flash memory including a pipe-shaped NAND string. A cell string may include a pipe connection, bit lines, a selection gate SG, and a control gate. As shown in FIG. 6B, since the first memory block BLK1" includes a U-shaped cell string, a source line having a low resistance may be applied thereto.

First and second word lines WL1 and WL2 of the first memory block BLK1" may constitute a first sub-block SB1, while third and fourth word lines WL3 and WL4 may constitute a second sub-block SB2. However, the first memory block BLK1" according to the inventive concept is not limited to a construction shown in FIG. 6B and may actually include a larger or smaller number of word lines than those shown in FIG. 6B. The inventive concept may be applied to the first memory blocks BLK1' and BLK1" shown in FIGS. 6A and 6B, but is not limited thereto and may be applied to various kinds of memory blocks.

Figure 7:
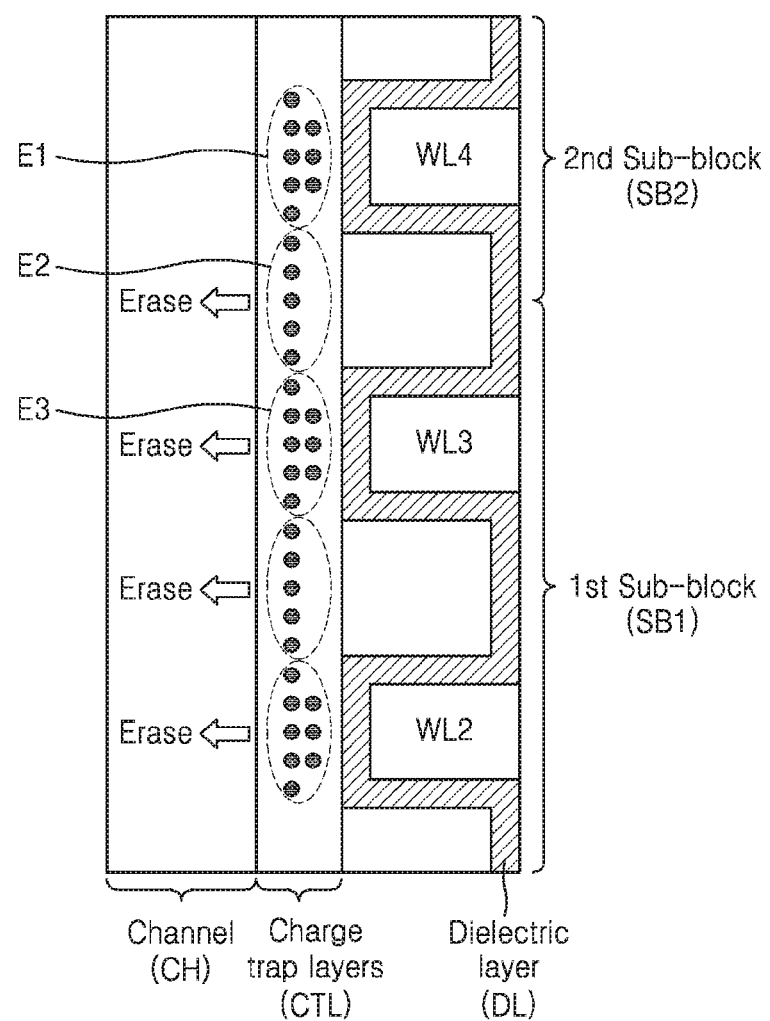
FIG. 7 illustrates a diagram showing a phenomenon that occurs when a partial erase operation is performed on a first sub-block SB1 including three-dimensional (3D) vertical NAND (VNAND) flash memory cells.

FIG. 7 illustrates a diagram showing a phenomenon that occurs when a partial erase operation is performed on a first sub-block SB1 including 3D VNAND flash memory cells.

Referring to FIG. 7, the first sub-block SB1 may include memory cells of a second word line WL2 and a third word line WL3, and a second sub-block SB2 may include memory cells of a fourth word line WL4. Data may be programmed in the first sub-block SB1 and the second sub-block SB2 so that electrons corresponding to each word line may be present in a charge trap layer CTL. In this case, third electrons E3 of the programmed third word line WL3 and first electrons E1 of the programmed fourth word line WL4 may spread and form second electrons E2. When an erase operation is performed on the first sub-block SB1, a portion of the second electrons E2 may be emitted to a channel CH during emission of the third electrons E3 to the channel CH. Some portion of the second electrons E2 have been injected and trapped in the channel for programming WL.

As a result, when the first sub-block SB1 is erased in units of sub-blocks, threshold voltages of the memory cells of the fourth word line WL4 of the second sub-block SB2, which is adjacent to the first sub-block SB1, may be reduced. In an embodiment, a fifth word line (not shown) disposed over the fourth word line WL4 may also be an adjacent word line, and threshold voltages of memory cells of the fifth word line may be reduced. However, the inventive concept is not limited to the present embodiment, and adjacent word lines, of which threshold voltages are affected by the erasing of the first sub-block SB1, may fall within various ranges.

In an embodiment, when the second sub-block SB2 is erased in units of sub-blocks, threshold voltages of the memory cells of the third word line WL3 or the second word line WL2, which corresponds to a word line adjacent to the second sub-block SB2, may be reduced. Thus, when one sub-block is erased, the inventive concept may be applied to word lines, which are included in other sub-blocks and adjacent to the erased sub-block. Thus, reliability of a memory device may be degraded.

Figure 8A:
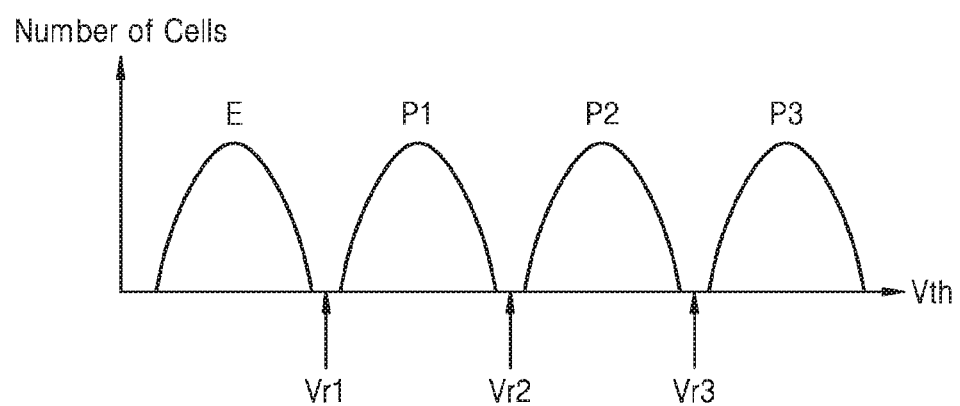
FIG. 8A illustrates a graph showing a distribution of threshold voltages after the programming of a memory device is completed when memory cells are multi-level cells.
Figure 8B:
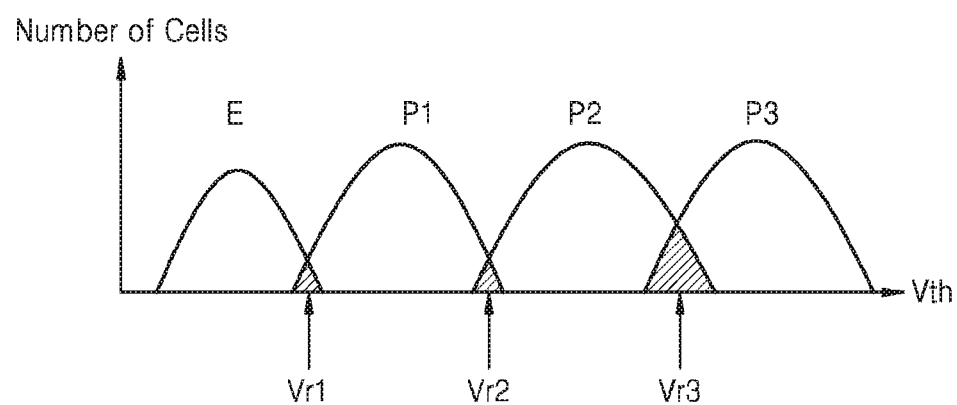
FIG. 8B illustrates a graph showing a distribution of threshold voltages after a partial erase operation is performed in units of sub-blocks.

FIG. 8A illustrates a graph showing a distribution of threshold voltages after the programming of the memory device 100 of FIG. 1 is completed when memory cells are multi-level cells. FIG. 8B illustrates a graph showing a distribution of threshold voltages after a partial erase operation is performed in units of sub-blocks.

Referring to FIG. 8A, an abscissa denotes a threshold voltage Vth, and an ordinate denotes the number of memory cells MC. The memory cells MC may be memory cells shown in FIG. 4 or FIG. 5. When the memory cell MC is a multi-level cell that is programmed with 2 bits, the memory cell MC may have one of an erase state E, a first program state P1, a second program state P2, and a third program state P3. Since an interval between distributions of threshold voltages Vth of multi-level cells is smaller than an interval between distributions of threshold voltages Vth of single-level cells, a data reading problem may become critical due to a small variation in threshold voltage Vth in the multi-level cells.

Each of first to third read voltages Vr1, Vr2, Vr3 may have an initialized default level. Specifically, the first read voltage Vr1 may have a voltage level between a distribution of memory cells MC having the erase state E and a distribution of memory cells MC having the first program state P1. The second read voltage Vr2 may have a voltage level between the distribution of the memory cells MC having the first program state P1 and a distribution of memory cells MC having the second program state P2. The third read voltage Vr3 may have a voltage level between the distribution of the memory cells having the second program state P2 and a distribution of memory cells MC having the third program state P3.

For example, when the first read voltage Vr1 is applied to control gates of the memory cells MCs, memory cells MC that are in the erase state E may be turned on, while the memory cells MC that are in the first program state P1 may be turned off. When the memory cells MC are turned on, current may flow through the memory cells MC. When the memory cells MC are turned off, no meaningful current may flow through the memory cells MC. Accordingly, data stored in the memory cells MC may be determined depending on whether the memory cells MC are turned on.

In an embodiment, when memory cells MC are turned on by applying the first read voltage Vr1, it may be determined that data '1' is stored. When memory cells MC are turned off, it may be determined that data '0' is stored. However, the inventive concept is not limited thereto. In another embodiment, when the memory cells MC are turned on by applying the first read voltage Vr1, it may be determined that data '0' is stored. When the memory cells MC are turned off, it may be determined that data '1' is stored. As described above, allocation of logic levels of data may be changed depending on embodiments.

FIG. 8B illustrates a graph showing the distribution of threshold voltages after an erase operation is performed in units of sub-blocks in the memory device having the distribution of FIG. 8A.

Referring to FIG. 8B, the memory cells MCs may be respectively programmed into an erase state E and first to third program states P1 to P3, and threshold voltages Vth of the memory cells of the fourth word line WL4 of FIG. 7 may be reduced when adjacent sub-blocks are erased in units of sub-blocks. Thus, the memory device may exhibit a changed distribution of threshold voltages as shown in FIG. 8B. In FIG. 8B, read errors may occur in memory cells MC that belong to a stripped portion, so reliability of the memory device 100 may be degraded.

When data is read from the memory device 100, a raw bit error rate (RBER) may vary according to a voltage level of a read voltage. An optimum voltage level of the read voltage may depend on the threshold voltage distribution of the memory cells MCs. Accordingly, the optimum voltage level of the read voltage, which is required to read data from the memory device 100, may vary according to the threshold voltage distribution of the memory cell MC.

The case in which the memory cells MCs are the multi-level cells has been described above with reference to FIGS. 8A and 8B. However, the inventive concept is not limited thereto, and the memory cells MCs may be single-level cells, triple-level cells, or cells that are programmed with 4 bits or more. Also, the memory device 100 shown in FIGS. 1 and 2 may include memory cells MC that are programmed with different numbers of bits.

Figure 9A:
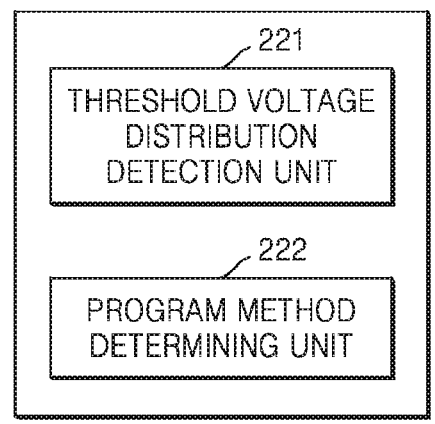
FIG. 9A illustrates a detailed block diagram of an adjacent word line program operation control unit of FIG. 1.
Figure 9B:
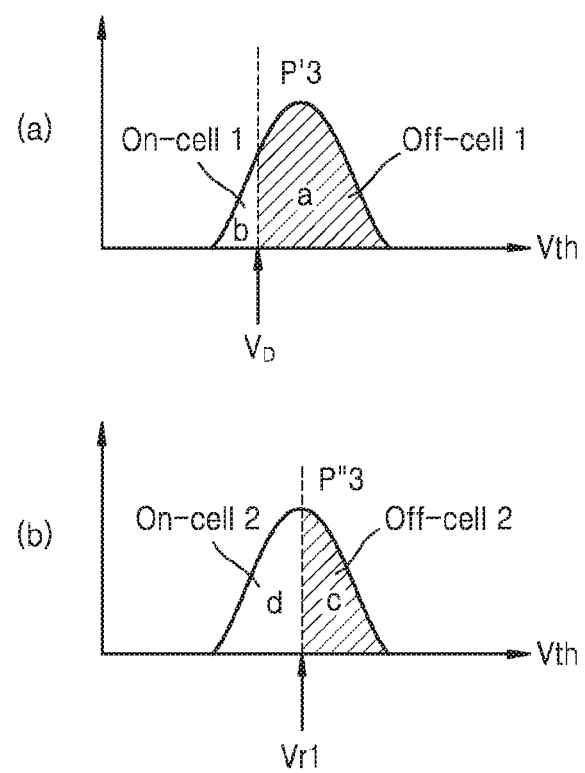
FIG. 9B illustrates a diagram illustrating a method of detecting off-cells using a program method determining unit.

FIG. 9A illustrates a detailed block diagram of the adjacent word line program operation control unit 220 of FIG. 1. FIG. 9B illustrates a diagram illustrating a method of detecting off-cells using a program method determining unit 222.

Referring to FIGS. 5 and 9A, the adjacent word line program operation control unit 220 may include a threshold voltage distribution detection unit 221 and a program method determining unit 222. In an embodiment, the first sub-block SB1 and the second sub-block SB2 may remain programmed using a first program method in which data having a first number of bits is programmed in one memory cell. Subsequently, when the first sub-block SB1 is partially erased in units of sub-blocks by the memory controller, the threshold voltage distribution detecting unit 221 may detect distributions of threshold voltages of a plurality of memory cells of the first sub-block SB1 and the second sub-block SB2.

On basis of the detected threshold voltages, the program method determining unit 222 may determine whether the partial erasing of the first sub-block SB1 has caused shifting of threshold voltages of memory cells of adjacent word lines, for example, the fourth word line WL4. In an embodiment, the determination operation may be performed by using an off-cell detection method.

Referring to FIG. 5, curve (a) in FIG. 9B and curve (b) in FIG. 9B, curve (a) shows a case in which threshold voltage distribution of the third program state P3 of FIG. 8A is modified into threshold voltage distribution of a third program state' P'3. Threshold voltage distribution of the third program state' P'3 may be shifted to lower direction due to the sub-block erasing of the first sub-block SB1. In this case, a detection voltage VD may correspond to the third read voltage Vr3 of FIG. 8. When the detection voltage VD is applied to a control gate of a memory cell MC, portion "a" may be turned off and detected as first off-cells off-cell1, and portion "b" may be turned on and detected as first on-cells on-cell1. Curve (b) in FIG. 9B shows a case in which a third program state" P"3 becomes lower than the third program state' P'3 of curve (a), and more second off-cells off-cell2 than the first off-cells off-cell1 are detected. The program method determining unit 222 may store the number of off-cells using the off-cell detection method. In an embodiment, the program method determining unit 222 may determine a program method depending on whether off-cells of memory cells that are in the corresponding program state are equal to and smaller than a reference value. In this case, the detection voltage VD may be higher than the third read voltage Vr3 of FIG. 8.

The program method determining unit 222 may determine a program method to be performed on a memory device. In an embodiment, when the distribution of the threshold voltages is changed from that of FIG. 8A to that of FIG. 8B due to the erasing of the first sub-block SB1 in the units of sub-blocks, the program method determining unit 222 may change the program method from the first program method into a second program method. The second program method may be a method of programming data having a second number of bits in each of memory cells of a second adjacent word line of the second sub-block SB2, which is adjacent to the first sub-block SB1. The first number of bits according to the first program method may be a greater number of bits than the second number of bits according to the second program method. For example the first program method may be a method of programming 3-bit data in multi-level cells, while the second program method may be a method of programming 2-bit data in multi-level cells or single-level cells.

Furthermore, the first program method may differ from the second program method in terms of a program voltage. Specifically, the second program method may boost threshold voltages of the memory cells of the second adjacent word lines more than the first program method. For example, in the second program method, a program voltage having a higher voltage level than in the first program method may be applied. In yet another embodiment, each of the first program method and the second program method may be an incremental-step-pulse-program (ISPP) method by which a program voltage is gradually increased by a predetermined step voltage. In the second program method, a program operation may be performed by setting at least one of the step voltage and a pulse application time to be greater than in the first program method. Therefore, according to the second program method, the threshold voltages of the memory cells of the second adjacent word lines may be boosted more than in the first program method. Thus, reductions in the threshold voltages due to the erasing of the first sub-block SB1 in the units of sub-blocks may be compensated in advance, thereby improving data reliability of the memory device 100.

However, in an embodiment, when the distribution of the threshold voltages as shown in FIG. 8A is not changed into the distribution of the threshold voltages as shown in FIG. 8B by using an off-cell detection method, a program operation may be performed by using the previous program method. For example, when the previous first program method is performed and the threshold voltages are not varied to be unlike in FIG. 8B, the first program method may be still used for adjacent word lines of the erased sub-block. Also, after a program operation is performed on the adjacent word lines of the erased sub-block using the second program method, when the modification of the threshold voltages shown in FIG. 8B is not detected, a program operation may be performed on the adjacent word lines using the first program method.

Furthermore, in an embodiment, the adjacent word line program operation control unit 220 may simply perform a program operation on the adjacent word lines of the erased sub-block using the second program method without performing a threshold voltage distribution detection operation. For example, a program operation may be performed on the second adjacent word line, which is adjacent to the first sub-block SB1, using the second program method, and a program operation may be performed on the first adjacent word line, which is adjacent to the second sub-block SB2, using the second program method. That is, for example, a program operation may be performed on the first adjacent word line and the second adjacent word line using a single-level cell program method, while a program operation may be performed on the first sub-block SB1, except the first adjacent word line, and the second sub-block SB2, except the second adjacent word line, using a multi-level cell program method. However, the inventive concept is not limited thereto, a program operation may be performed on the first adjacent word line and the second adjacent word line using a method of programming data having a smaller number of bits than the first sub-block SB1 and the second sub-block SB2 other than the adjacent word lines.

Figure 10A:
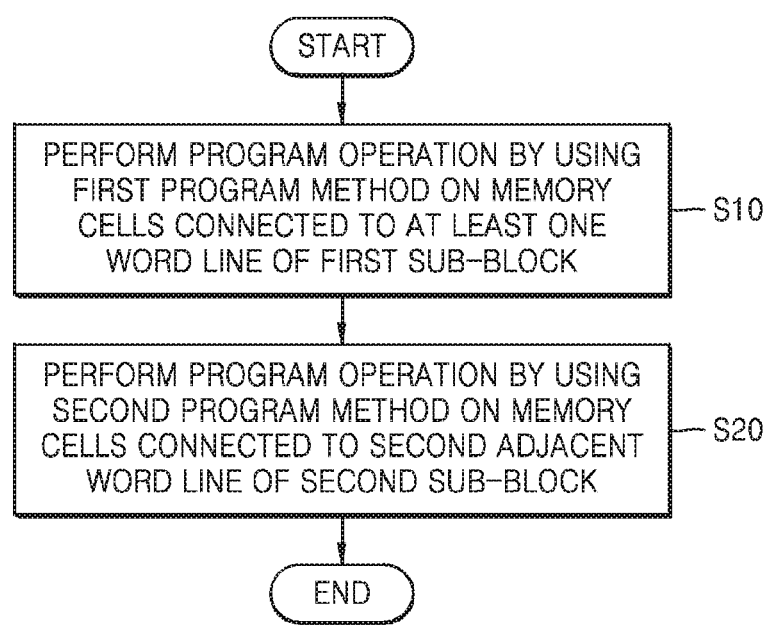
FIGS. 10A and 10B illustrate flowcharts of a method of operating a memory system according to an exemplary embodiment of the inventive concept.
Figure 10B:
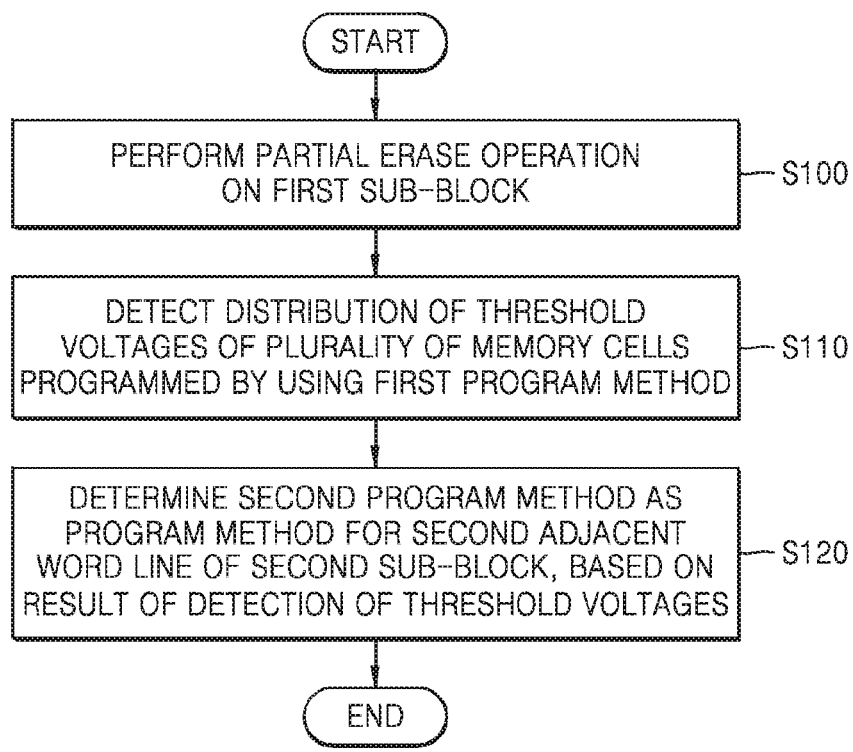

FIGS. 10A and 10B illustrate flowcharts of a method of operating a memory system according to an exemplary embodiment of the inventive concept.

Referring to FIGS. 5 and 10A, a program operation may be performed using the first program method on memory cells connected to at least one of the first sub-block SB1 (S10). A program operation may be performed using the second program method on memory cells connected to at least one word line (e.g., a second word line) that is included in the second sub-block SB2 and adjacent to the first sub-block SB1 (S20).

Referring to FIGS. 5 and 10B, a partial erase operation may be performed in units of sub-blocks on the first-block SB1 (S100). A distribution of threshold voltages of a plurality of memory cells may be detected (S110). In this case, the partial erase operation may affect threshold voltages of memory cells of the second adjacent word line adjacent to the first sub-block SB1 so that threshold voltages may be shifted to lower direction. The second adjacent word line may be the fourth word line WL4. Furthermore, the second adjacent word line may be the fourth word line WL4 and the fifth word line WL5, but is not limited thereto. On basis of a result of detection of the threshold voltages, the second program method may be determined as a program method for the second adjacent word line of the second sub-block (S120).

Figure 11:
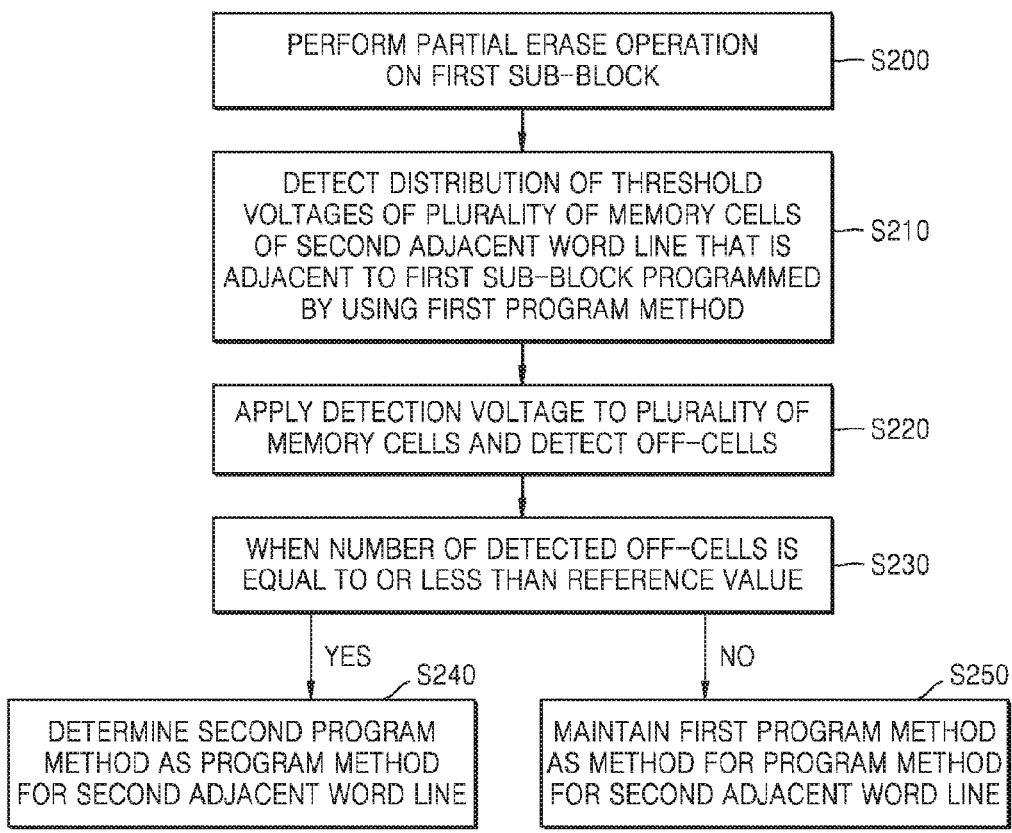
FIG. 11 illustrates a flowchart of a method of operating a memory system according to another exemplary embodiment of the inventive concept.

FIG. 11 illustrates a flowchart of a method of operating a memory system according to another exemplary embodiment of the inventive concept.

Referring FIGS. 5 and 11, a program operation is performed using the first program method on the first sub-block SB1 and the second sub-block SB2. A partial erase operation may be performed on the first sub-block SB1 in the units of sub-blocks (S200). A distribution of threshold voltages of a plurality of memory cells may be detected (S210). A detection voltage may be applied to the plurality of memory cells to detect off-cells having threshold voltages that are higher than the detection voltage (S220). The off-cells may be detected, and a program method may be determined based on the number of off-cells (S230). The number of detected off-cells may be stored, and when the number of detected off-cells is equal to or smaller than a reference value, the second program method may be determined as a program method for the second adjacent word line that is adjacent to the first sub-block SB1 (S240). Also, when the number of detected off-cells exceeds the reference value, the first program method may be maintained as a program method for the second adjacent word line (S250).

Figure 12A:
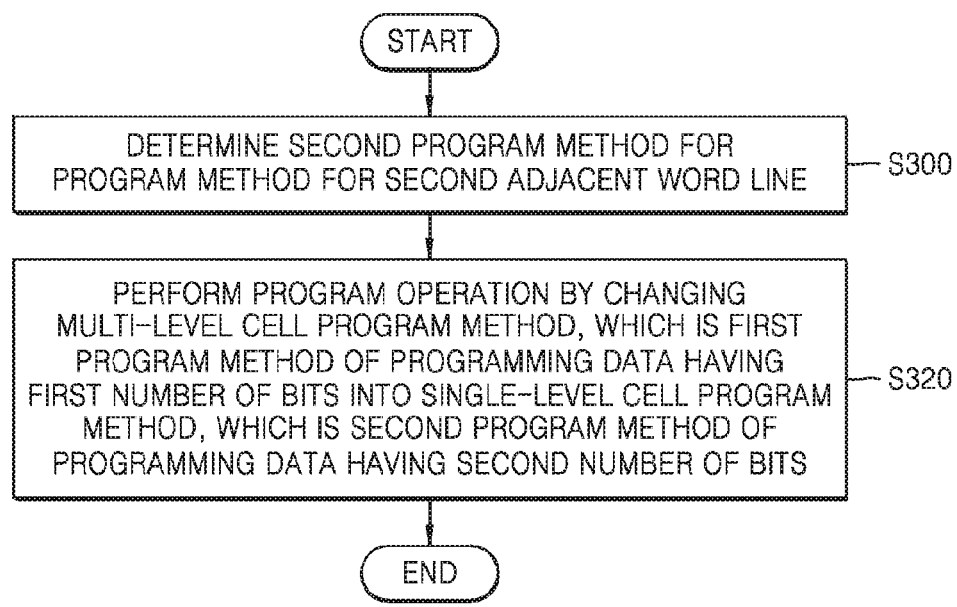
FIG. 12A illustrates a flowchart of an operation of the memory system after operation S240 of FIG. 11, according to an exemplary embodiment of the inventive concept.
Figure 12B:
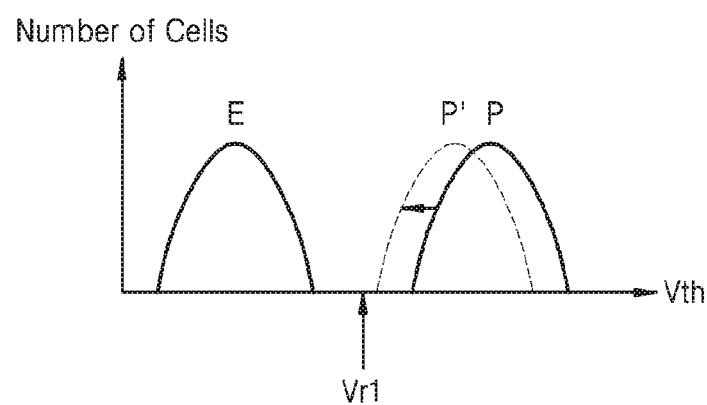
FIG. 12B illustrates a graph showing a distribution of threshold voltages of memory cells after the operation of the memory system shown in FIG. 12A.

FIG. 12A illustrates a flowchart of an operation of the memory system after operation S240 of FIG. 11, according to an exemplary embodiment of the inventive concept. FIG. 12B illustrates a graph showing a distribution of threshold voltages of memory cells after the operation of the memory system shown in FIG. 12A.

Referring to FIG. 12A, after the second program method is determined as the program method for the second adjacent word line (S300), a program operation may be performed by changing a multi-level cell program method, which is the first program method of programming data having a first number of bits, into a single-level cell program method, which is the second program method of programming data having a second number of bits (S320). For example, the first number of bits may be 2 bits, and the second number of bits may be 1 bit.

Referring to FIG. 12B, when the program method for the adjacent word lines of the sub-block that is erased in units of sub-blocks is changed from the multi-level cell program method of programming 2-bit data into the single-level cell program method of programming 1-bit data, occurrence of errors due to drops in threshold voltages may be reduced. That is, even if the program state P1, which corresponds to a distribution of threshold voltages of memory cells of the adjacent word line, is dropped to a program state' P' due to the erasing of the adjacent sub-block in the units of sub-blocks, the erase state E may be distinguished from the program state' P' due to the first read voltage Vr1. Accordingly, the programmed data can be read without errors by using the first read voltage Vr1, so that the influence of the erasing of the sub-block in the units of sub-blocks upon the adjacent word line may be reduced. However, since the first number of bits that are programmed in the first program method refer to a larger number of bits than the second number of bits that are programmed in the second program method, the inventive concept is not limited to the above-described example. That is, the first number of bits may be 3 bits, and the second number of bits may be 1 bit or 2 bits.

Figure 13A:
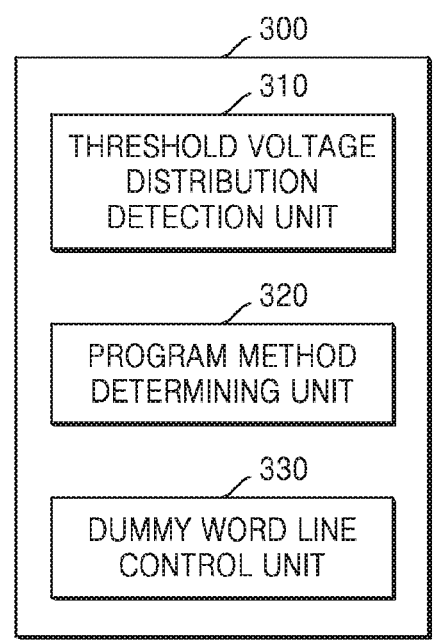
FIG. 13A illustrates a detailed block diagram of the adjacent word line program operation control unit of FIG. 1.
Figure 13B:
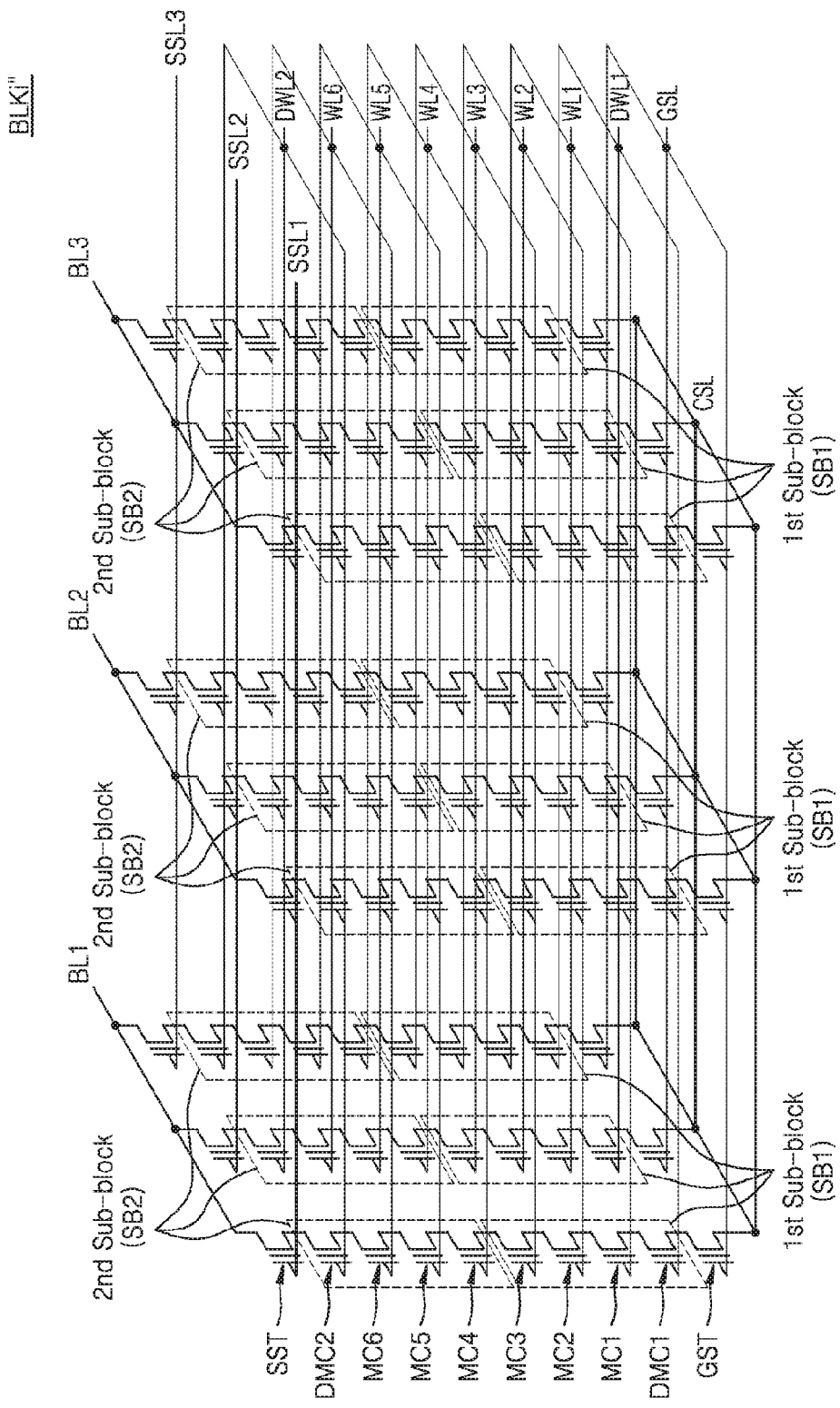
FIG. 13B illustrates a circuit diagram of the memory block included in the memory cell array, according to an exemplary embodiment of the inventive concept.

FIG. 13A illustrates a detailed block diagram of the adjacent word line program operation control unit 220 of FIG. 1. FIG. 13B illustrates a circuit diagram of a first memory block BLK" included in the memory cell array 110, according to another exemplary embodiment of the inventive concept.

Referring to FIGS. 13A and 13B, a word line program operation control unit 300 may further include a dummy word line control unit 330 as compared with the adjacent word line program operation control unit 220 of FIG. 9A. As compared with the first memory block BLK1' of FIG. 5, the first memory block BLK1" may further include first and second dummy word lines DWL1 and DWL2. The first dummy word line DWL1 may be included in the first sub-block SB1, and the second dummy word line DWL2 may be included in the second sub-block SB2. To reduce the influence of the erasing of the first sub-block SB1 upon threshold voltages of memory cells of the adjacent word line (e.g., the fourth word line WL4), in an embodiment, a program operation may be performed on the fourth word line WL4 by changing the first program method of programming 2-bit data in one memory cell into the second program method of programming 1-bit data in one memory cell. In this case, the data capacity of the second sub-block SB2 may be varied by changing the program method for the fourth word line WL4. To compensate for the variation of the data capacity of the second sub-block SB2, partial data may be programmed in the second dummy word line DWL2. The dummy word line control unit 330 may control a program operation on the second dummy word line DWL2. In an embodiment, the dummy word line control unit 330 may control a program operation on the first dummy word line DWL1 to compensate for the variation of the data storage of the first sub-block SB1.

Figure 14A:
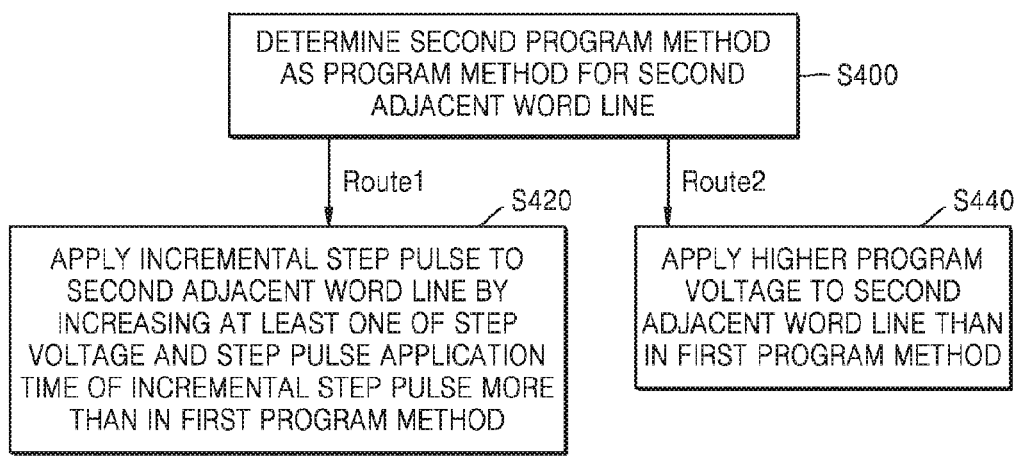
FIG. 14A illustrates a flowchart of an operation of the memory system after operation S240 of FIG. 11, according to an exemplary embodiment of the inventive concept.
Figure 14B:
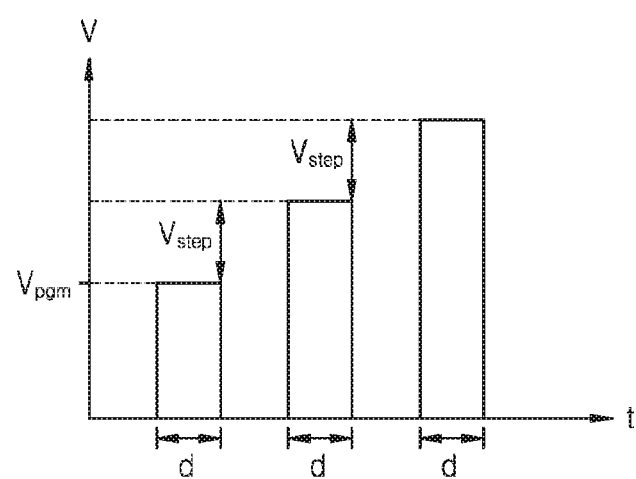
FIG. 14B illustrates a graph showing control target elements in an incremental step pulse program (ISPP) method, according to an exemplary embodiment of the inventive concept.
Figure 14C:
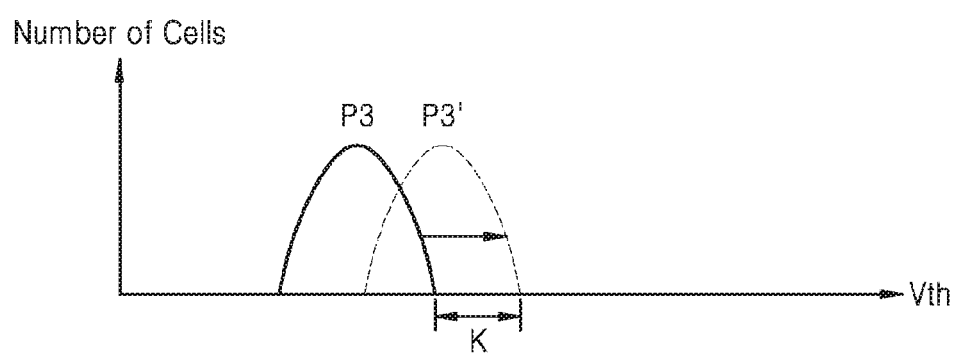
FIG. 14C illustrates a graph showing threshold voltages that are varied by controlling the control target elements shown in FIG. 14B.

FIG. 14A illustrates a flowchart of an operation of the memory system after operation S240 of FIG. 11, according to an exemplary embodiment of the inventive concept. FIG. 14B illustrates a graph showing control target elements in an ISPP method, according to an exemplary embodiment of the inventive concept. FIG. 14C illustrates a graph showing threshold voltages that are varied by controlling the control target elements shown in FIG. 14B.

Referring to FIGS. 5, 14A, and 14B, a program method for the second adjacent word line may be changed from the first program method into the second program method (S400). In this case, each of the first program method and the second program method may be an ISPP method. In the second program method, an incremental step pulse generated by increasing at least one of a step voltage Vstep and a pulse application time "d" more than an incremental step pulse applied in the first program may be applied (S420). In another case, in the second program method, a higher program voltage Vpgm than in the first program method may be provided (S440). In this case, as described above with reference to FIGS. 9A, 9B, and 9C, variations in threshold voltages may be determined by using an off-cell detection method, any one of the program voltage Vpgm, the step voltage Vstep, and the pulse application time "d" may be differently controlled according to the variations in the threshold voltages, and the controlled one of the program voltage Vpgm, the step voltage Vstep, and the pulse application time "d" may be provided to the adjacent word line. In an embodiment, when the threshold voltages drop below predetermined range, the step voltage Vstep and the pulse application time d that are applied to the adjacent word line may be controlled to compensate the threshold voltages drop.

Referring to FIG. 14C, the program voltage Vpgm, the step voltage Vstep, and the pulse application time "d" shown in FIG. 14B may be controlled so that threshold voltages of a plurality of memory cells of a word line that is adjacent to the sub-block erased in the units of sub-blocks may be controlled. In an embodiment, as the program voltage Vpgm, the step voltage Vstep and the pulse application time "d" are increased, an extent K to which the threshold voltages of the plurality of memory cells are boosted may be increase increased.

Figure 15A:
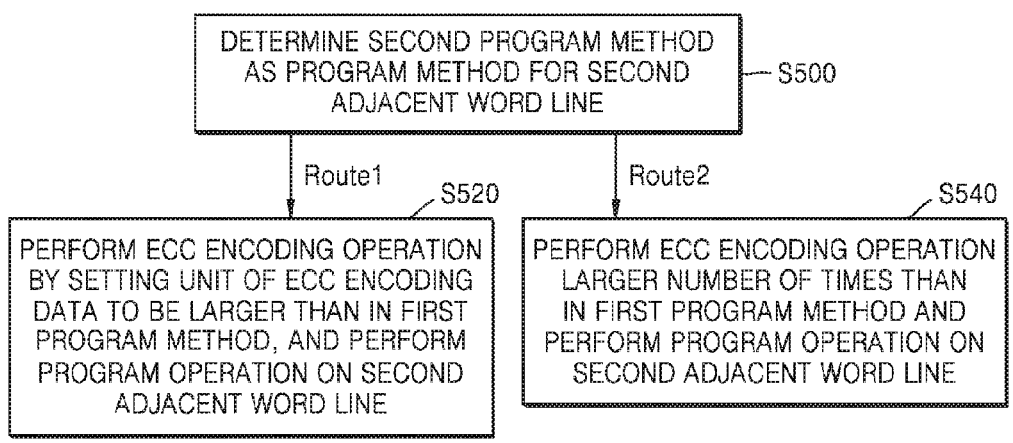
FIG. 15A illustrates a flowchart of an operation of the memory system after operation S240 of FIG. 11, according to another exemplary embodiment of the inventive concept.
Figure 15B:
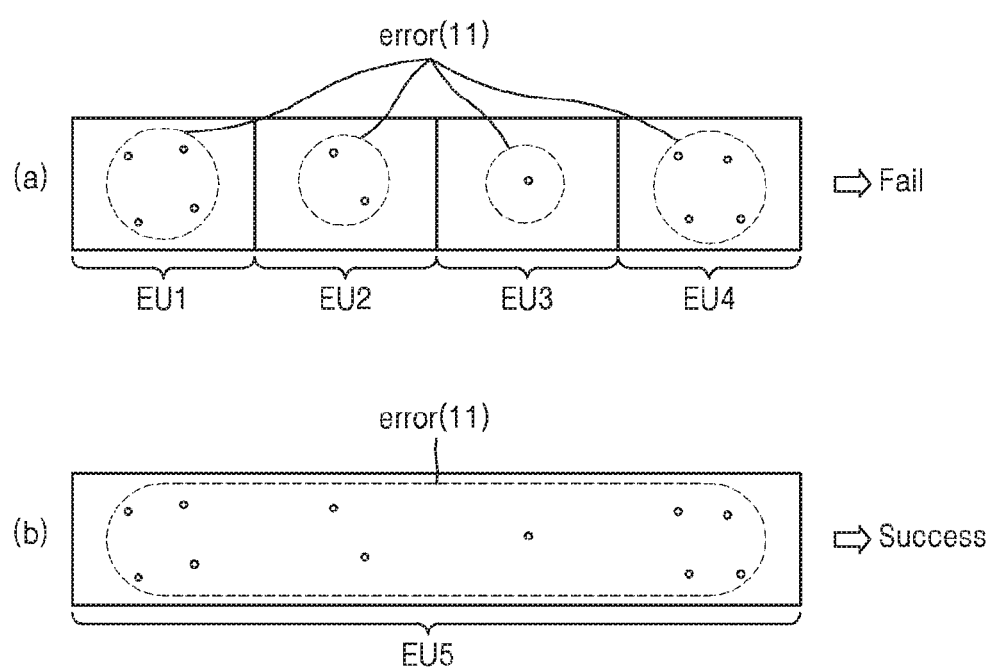
FIG. 15B illustrates a diagram for explaining error correction capability relative to the unit of error correction code (ECC) encoding data.

FIG. 15A illustrates a flowchart of an operation of the memory system after operation S240 of FIG. 11, according to another exemplary embodiment of the inventive concept. FIG. 15B illustrates a diagram for explaining error correction capability relative to the unit of ECC encoding data.

Referring to FIG. 15A, a program method for the second adjacent word line may be changed from the first program method into the second program method (S500). In the second program method, the unit of ECC encoding data may be set to be larger than in the first program method, and a program operation may be performed on memory cells connected to the second adjacent word line.

In this case, after the ECC encoding operation is performed by setting the unit of ECC encoding data to be larger than in the first program method, a program operation may be performed on memory cells connected to the second adjacent word line (S520). Referring to FIG. 15B, in diagram (a), a first unit EU1 may have four errors, a second unit EU2 may have two errors, a third unit EU3 may have one error, and a fourth unit EU4 may have four errors. Assuming that each of the units EU1, EU2, EU3, and EU4 has an error correction capability of 3, the number of errors of first unit EU1 and fourth unit EU4 may exceed the error correction capability of first unit EU1 and fourth unit EU4 and the units become subject to errors.

In this case, by increasing the unit of ECC encoding data, an ECC encoding operation may be performed on a fifth unit EU5, which is obtained by unifying the first to fourth units EU1 to EU4, as shown in diagram (b). Thus, since the fifth unit EU5 is capable of correcting twelve errors, the fifth unit EU5 may correct the existing eleven errors. Accordingly, error correction capability may be elevated by increasing the unit of ECC encoding data.

Referring back to FIG. 15A, unlike in operation S520, after an ECC encoding operation is performed a larger number of times than in the first program method, a program operation may be performed on memory cells connected to the second adjacent word line (S540). In an embodiment, the first program method may include performing an ECC encoding operation one time, while the second program method may include performing the ECC encoding operation at least twice. Furthermore, in the second program method, the ECC encoding operation may be performed a plurality of times by gradually increasing the unit of ECC encoding data.

Figure 16:
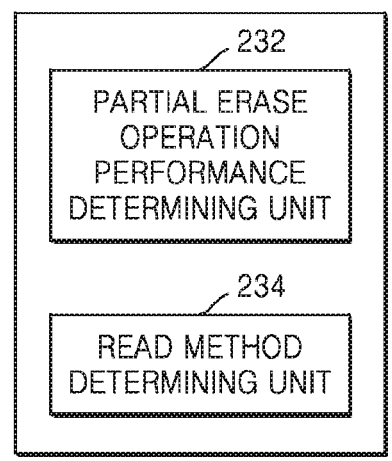
FIG. 16 illustrates a detailed block diagram of an adjacent word line read operation control unit 230 of FIG. 1, according to an exemplary embodiment of the inventive concept.

FIG. 16 illustrates a schematic block diagram of the adjacent word line read operation control unit 230 of FIG. 1, according to an exemplary embodiment of the inventive concept.

Referring to FIG. 16, the adjacent word line read operation control unit 230 may include a partial erase operation performance determining unit 232 and a read method determining unit 234. A partial erase operation refers to an operation of erasing sub-blocks in units of sub-blocks. The partial erase operation performance determining unit 232 may determine whether a partial erase operation has been performed. In an embodiment, the partial erase operation performance determining unit 232 may determine whether the partial erase operation has been performed and detect an address of a sub-block on which the partial erase operation has been performed, with reference to a flash translation layer (FTL), and store determination and detection results. In another embodiment, any one of memory cells of the sub-block may be determined as a flag cell, or any one of memory cells of a word line adjacent to the sub-block may be determined as a flag cell. Also, when the partial erase operation is performed on the sub-block, data may be set to '1', while the partial erase operation is performed on the sub-block, data may be set to '0'. Thus, the partial erase operation performance determining unit 232 may determine whether the partial erase operation has been performed on the flag cell.

The read method determining unit 234 may determine a read method for an adjacent word line, which is adjacent to the sub-block on which the partial erase operation has been performed, depending on whether the partial erase operation has been performed. In an embodiment, a first read method is used to read data programmed in the memory cells connected to the adjacent word line. When the partial erase operation is performed, the read method determining unit 234 may change a read method from the first read method into a second read method and perform a read operation on the adjacent word line using the second read method. However, when the partial erase operation is not performed, the first read method may be maintained. In the second read method performed by the read method determining unit 234, a read voltage having a smaller magnitude than in the first read method may be applied to read memory cells in which the same data is programmed. Also, the second read method may be a soft decision read method including performing a read operation at least twice. The second read method may include performing a read operation a larger number of times than in the first read method. Also, the read method determining unit 234 may not only determine whether the partial erase operation has been performed but also determine a read method based on complicated information, such as the number of program/erase cycles, the number of partial erase cycles, a state of cells, and the number of errors.

Figure 17:
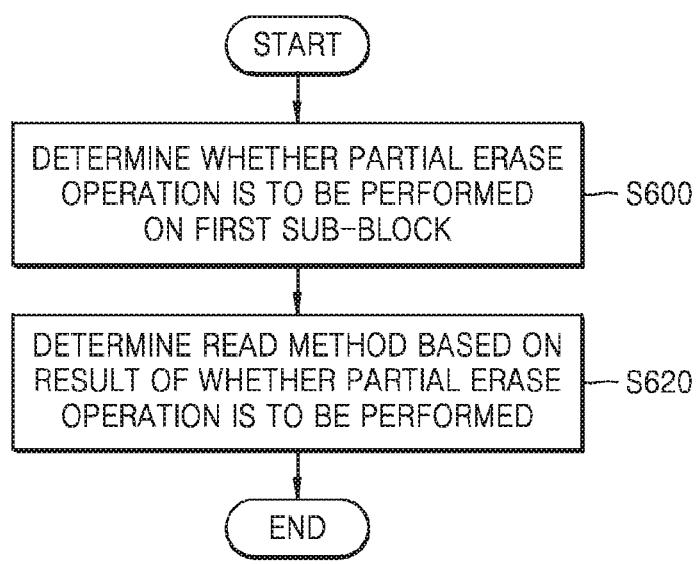
FIG. 17 illustrates a flowchart of operations of a memory system according to an exemplary embodiment of the inventive concept.

FIG. 17 illustrates a flowchart of an operation of a memory system according to an exemplary embodiment of the inventive concept.

Referring to FIGS. 5 and 17, it may be determined whether a partial erase operation has been performed on the first sub-block SB1 (S600). Thus, a read method to be performed on a second adjacent word line that is adjacent to the first sub-block SB1 may be determined depending on whether the first sub-block SB1 has been partially erased in sub-block units (S620). In an embodiment, when the first sub-block SB1 is partially erased, a read method for minimizing occurrence of errors may be determined by adjusting read reference voltage levels of a plurality of memory cells of a second adjacent word line to compensate the effect of the partial erase operation.

Figure 18A:
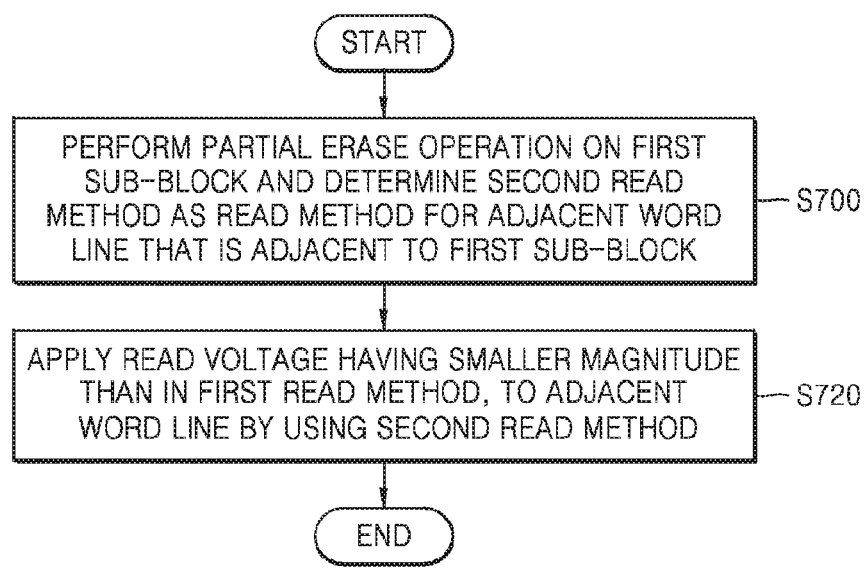
FIG. 18A illustrates a flowchart of an operation of a memory system after operation S620 of FIG. 17, according to an exemplary embodiment of the inventive concept.
Figure 18B:
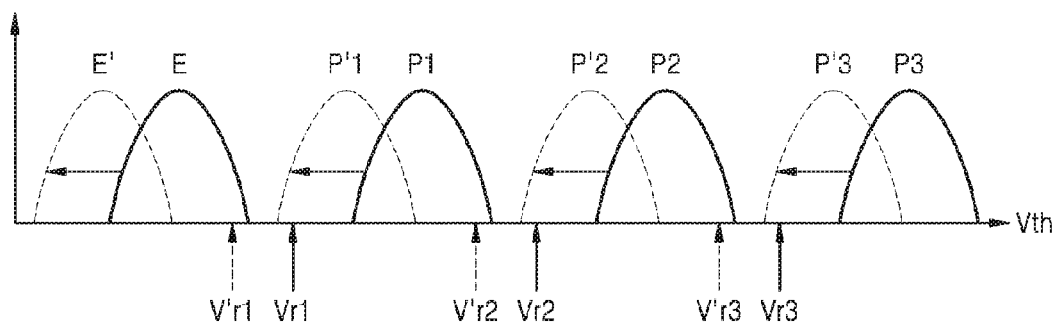
FIG. 18B illustrates a graph showing read voltages that are controlled according to threshold voltages.

FIG. 18A illustrates a flowchart of an operation of a memory system after operation S620 of FIG. 17, according to an exemplary embodiment of the inventive concept. FIG. 18B illustrates a graph showing read voltages that are controlled according to threshold voltages.

Referring to FIGS. 5 and 18A, a first read method may be used to read data programmed in the first sub-block SB1 and the second sub-block SB2. When a partial erase operation is performed on the first sub-block SB1, a second read method may be determined as a read method for an adjacent word line adjacent to the first sub-block SB1 (S700). The adjacent word line may correspond to the fourth word line WL4. In the second read method, a read voltage having a smaller magnitude than in the first read method may be applied to the adjacent word line (S720).

Referring to FIG. 18B, threshold voltages of memory cells of the adjacent word line may drop due to the partial erase operation of the first sub-block SB1 so that distributions of threshold voltages may be changed from solid curves into dotted curves. Thus, when a read operation is performed using first to third read voltages Vr1 to Vr3 that are provided for the first read method, probability of occurrence of errors may be increased. For example, in the third program state P3, all the threshold voltages of the memory cells may be higher than the third read voltage Vr3 so that third program data may be read without errors. However, in a changed third program state' P3, at least one of the memory cells may have lower threshold voltages than the third read voltage Vr3 so that errors may occur. Thus, the second read method may be determined as a read method so that first read voltage' to third read voltage' V'r1 to V'r3 having respectively smaller magnitudes than the first to third read voltages Vr1 to Vr3 of the first read method may be provided. Thus, a read operation may be performed on the erase state' E' and the first to third program state' P'1 to P'3 in which threshold voltages are changed, without causing errors.

Figure 19A:
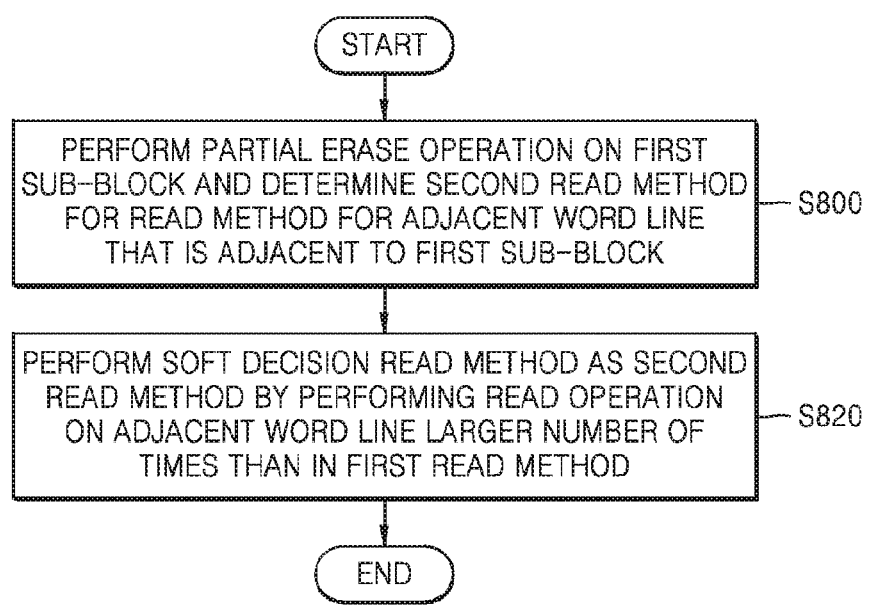
FIG. 19A illustrates a flowchart of an operation of the memory system after operation S620 of FIG. 17, according to an exemplary embodiment of the inventive concept.
Figure 19B:
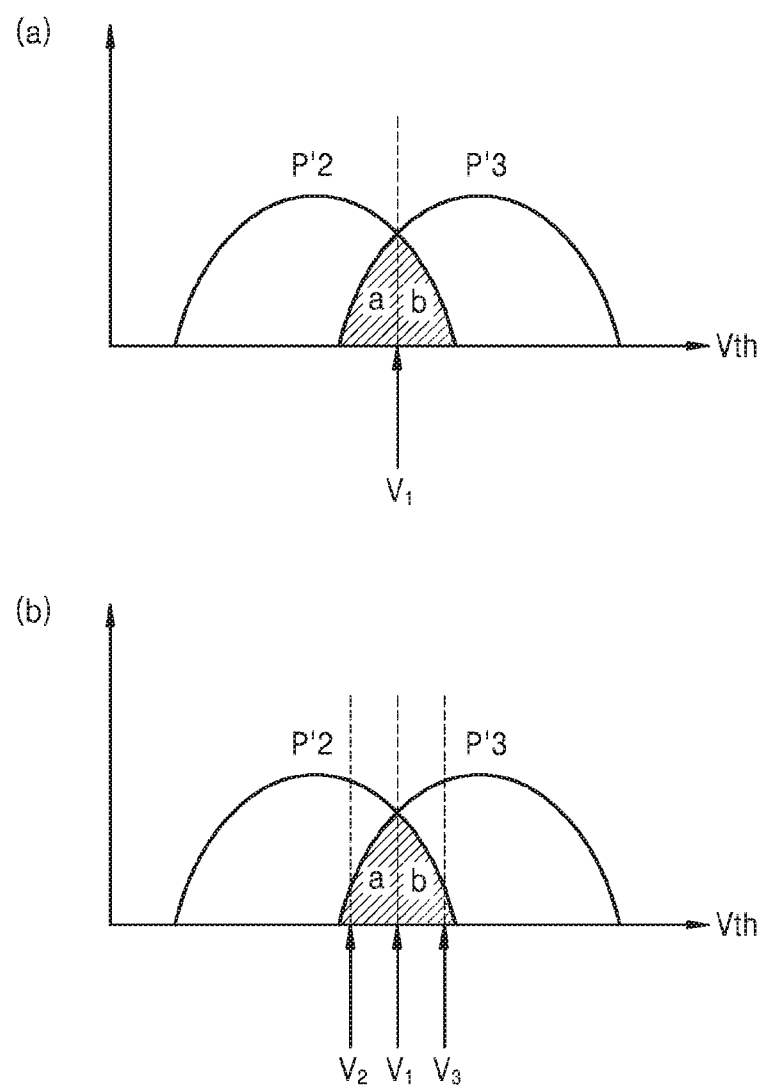
FIG. 19B illustrates graphs of read voltages relative to threshold voltages that are varied due to the operation of the memory system.

FIG. 19A illustrates a flowchart of an operation of the memory system after operation S620 of FIG. 17, according to an exemplary embodiment of the inventive concept. FIG. 19B illustrates curves of read voltages relative to threshold voltages that are varied due to the operation of the memory system.

Referring to FIGS. 5 and 19A, a first read method may be used to read programmed data from the first sub-block SB1 and the second sub-block SB2. Thereafter, a partial erase operation may be performed on the first sub-block SB1 so that the second read method may be determined as a read method for an adjacent word line that is adjacent to the first sub-block SB1 (S800). The second read method may be a soft decision read method. Thus, in the second read method, a read operation may be performed on the adjacent word line a larger number of times than in the first read method (S820).

Referring to FIG. 19B, curve (a) shows a third program state' P'3 and a second program state' P'2 in which distributions of threshold voltages of memory cells of the memory device are changed due to a partial erase operation of the first sub-block SB1. When a read operation is performed in the first read method by applying a first read voltage V1, errors may occur in memory cells in portion a of the third program state' P'3 and portion b of the second program state' P'2. Thus, according to the second read method, after the first read voltage V1 is applied, a read operation may be performed on the portion a by applying a second read voltage V2, and a read operation may be performed on the portion b by applying a third read voltage V3. The second read method may be referred to as a soft decision read method. As a result, as compared with the read operation performed using the first read method as shown in curve (a), when the read operation is performed using the second read method as shown in curve (b), even if the distributions of the threshold voltages of the memory cells are changed due to the partial erase operation, data may be read with a low probability of occurrence of errors.

Figure 20A:
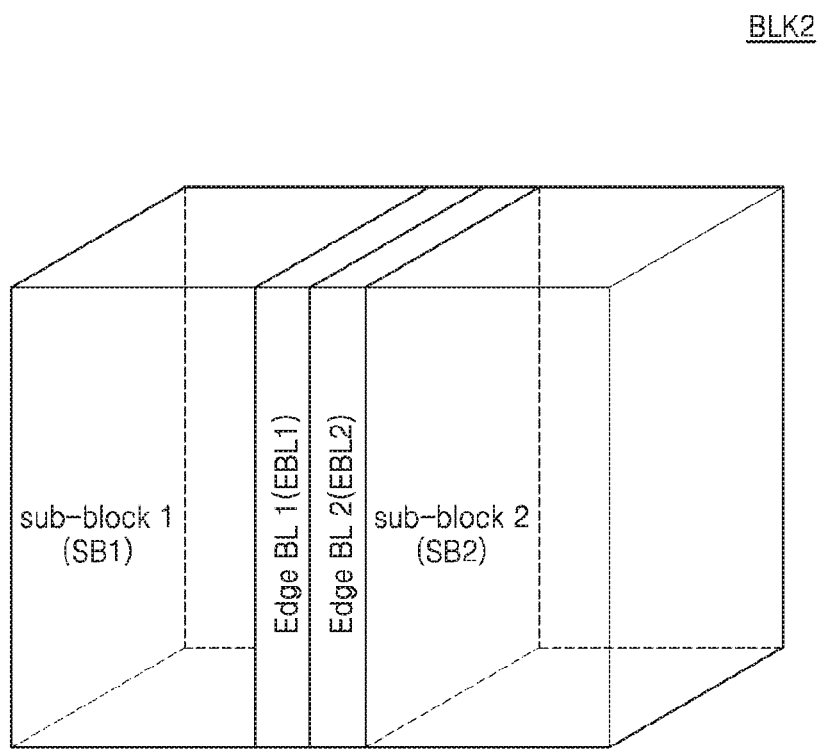
FIGS. 20A and 20B illustrate diagrams of various memory blocks to which the inventive concept may be applied.
Figure 20B:
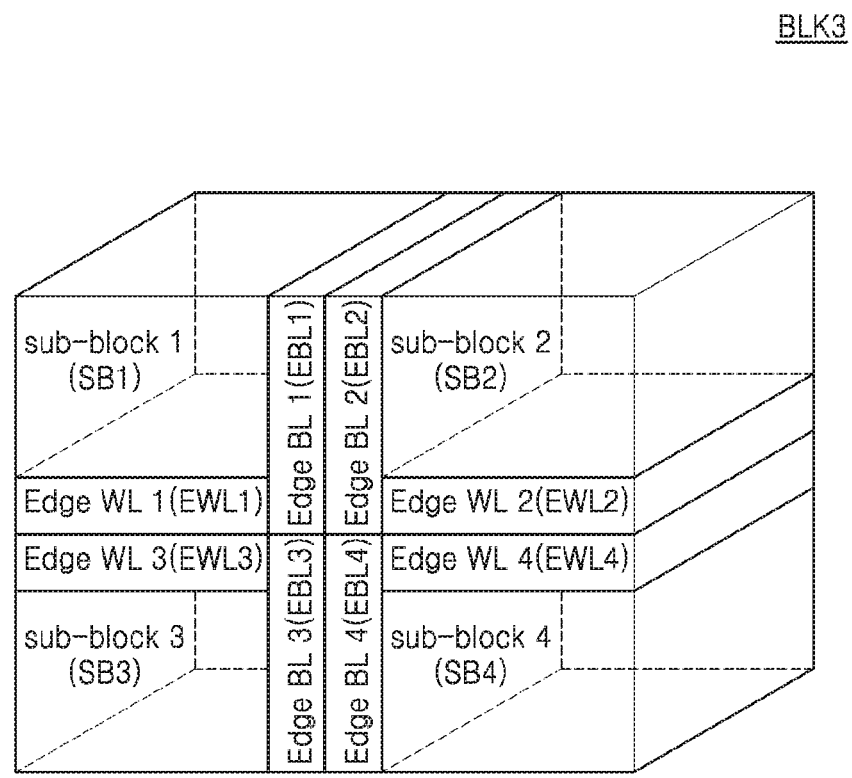

FIGS. 20A and 20B illustrate diagrams of various memory blocks to which the inventive concept may be applied.

Referring to FIG. 20A, a memory block BLK2 may include a plurality of NAND strings, a plurality of word lines, a plurality of bit lines, ground selection lines, a plurality of string selection lines, and a common source line. Here, the number of NAND strings, the number of word lines, the number of bit lines, the number of ground selection lines, and the number of string selection lines may be variously changed depending on embodiments.

Furthermore, the memory block BLK2 may further include a first sub-block SB1 and a second sub-block SB2, and each of the first sub-block SB1 and the second sub-block SB2 may include a plurality of memory cells. A second adjacent bit line EBL2 may be a bit line that is adjacent to the first sub-block SB1 and included in the second sub-block SB2, and a first adjacent bit line EBL1 may be a bit line that is adjacent to the second sub-block SB2 and included in the first sub-block SB1.

The embodiment according to the inventive concept described with reference to FIG. 1 may be applied to the memory block BLK2 of FIG. 20A. In an embodiment, in a memory block BLK on which a program operation is performed using a first program method or a read operation is performed using a first read method, when the first sub-block SB1 is erased in units of sub-blocks or when threshold voltages of memory cells are varied, a program operation may be performed by determining a second program method as a program method or a read operation may be performed by determining a second read method as a read method.

Referring to FIG. 20B, a memory block BLK3 may include a first sub-block SB1, a second sub-block SB2, a third sub-block SB3, and a fourth sub-block SB4. In an embodiment, a second adjacent bit line EBL2 may be a bit line that is adjacent to the first sub-block SB1 and included in the second sub-block SB2, and a first adjacent bit line EBL1 may be a bit line that is adjacent to the second sub-block SB2 and included in the first sub-block SB1. A third adjacent word line EWL3 may be a word line that is adjacent to the first sub-block SB1 and included in the third sub-block SB3, and a first adjacent word line EWL1 may be a bit line that is adjacent to the third sub-block SB3 and included in the first sub-block SB1. First to fourth sub-blocks SB1 to SB4 may respectively include adjacent word lines and adjacent bit lines, and the inventive concept may be applied to the adjacent word lines and the adjacent bit lines.

Figure 21:
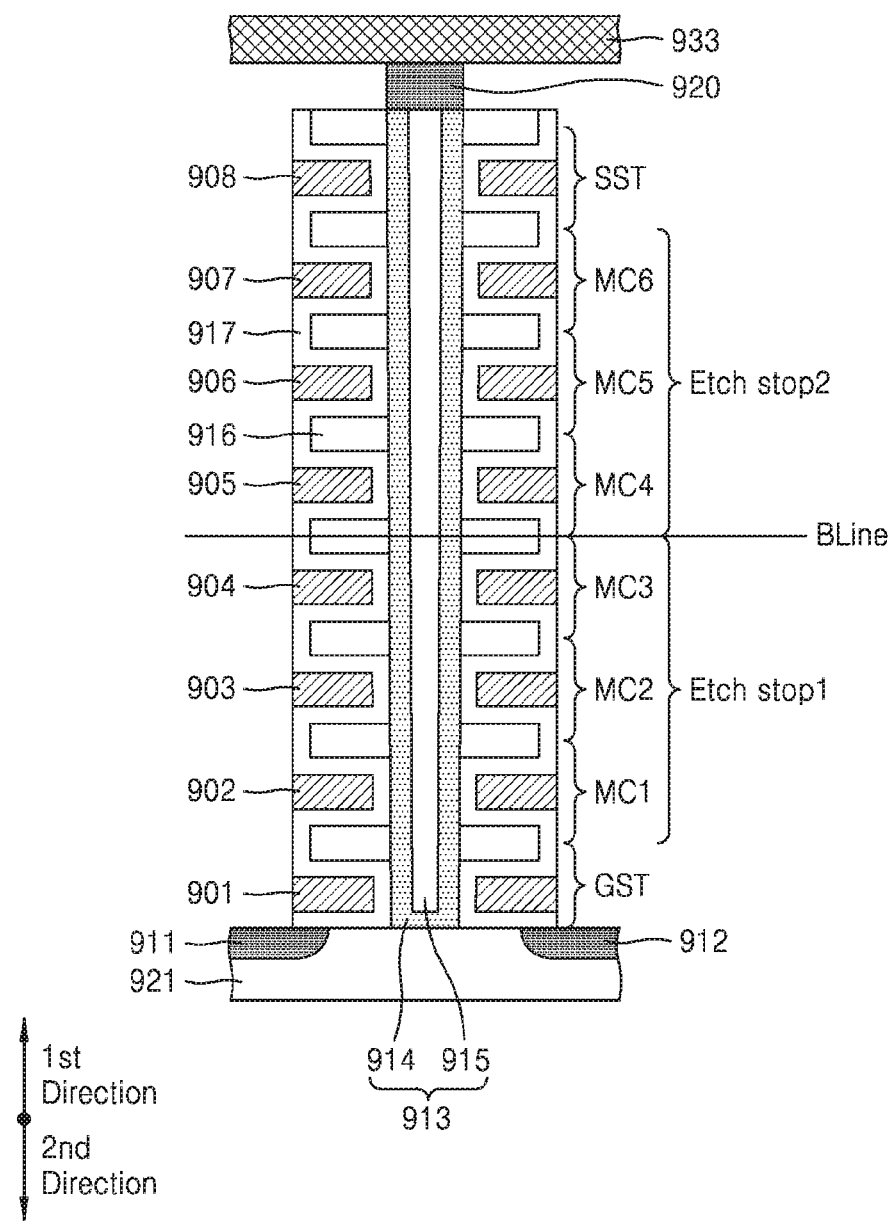
FIG. 21 illustrates a cross-sectional view of one NAND string of the memory block of FIG. 5, which depicts a process to which the inventive concept may be applied.

FIG. 21 illustrates a cross-sectional view of one NAND string of the memory block of FIG. 5, which depicts a process to which the inventive concept is applied.

Referring to FIG. 21, initially, a substrate 921 may be provided. As an example, the substrate 921 may be a well of a first type (e.g., first conductivity type). For example, the substrate 921 may be a p-well into which a Group-V element such as boron B is implanted. For example, the substrate 921 may be a pocket P-well provided in an n-well. The substrate 921 is a p-type well or p-type pocket well. However, a conductivity type of the substrate 921 is not limited to the p-type.

A plurality of doped regions, for example, doped regions 911 and 912, may be provided on the substrate 921. For instance, the doped regions 911 and 912 may be of a second type (e.g., a second conductivity type), which is different from the substrate 921.

For example, the doped regions 911 and 912 may be of an n type, but the inventive concept is not limited to the present embodiment.

A plurality of insulating materials 916 may be sequentially provided on a region of the substrate 921 between the first and second doped regions 911 and 912 in a first direction. For example, the plurality of insulating materials 916 may be spaced a predetermined distance apart from one another in the first direction. As an example, the insulating materials 916 may include an insulating material, such as silicon oxide.

A pillar 913 may be provided on a region of the substrate 921 between the first and second doped regions 911 and 912, and penetrate the insulating materials 916 in the first direction. For example, the pillar 913 may penetrate the insulating materials 916 and contact the substrate 921.

The pillar 913 may include a plurality of materials. For example, a surface layer 914 of the pillar 913 may include a silicon material of a first type. For example, the surface layer 914 of the pillar 913 may include a silicon material of the same type as the substrate 921. The surface layer 914 of the pillar 913 includes p-type silicon. However, the inventive concept is not limited to the example in which the surface layer 914 of the pillar 913 includes p-type silicon.

An internal layer 915 of the pillar 913 may include an insulating material. For example, the internal layer 915 of the pillar 913 may include an insulating material such as silicon oxide. For example, the internal layer 915 of the pillar 913 may include an air gap.

An insulating layer 917 may be provided in a region between the first and second doped regions 911 and 912 along exposed surfaces of the insulating materials 916, the pillar 913, and the substrate 921.

First conductive materials 901 to 908 may be provided in the region between the first and second doped regions 911 and 912 on an exposed surface of the insulating layer 917. For instance, the first conductive materials 901 to 908 may be provided between the substrate 921 and the insulating material 916, which is adjacent to the substrate 921, and extend in a first direction.

For example, a plurality of first conductive materials 901 to 908 may be provided between the insulating materials 916 and extend in the first direction. The first conductive materials 901 to 908 may be metal materials or conductive materials such as polysilicon (poly-Si).

An etch stop process may be used to form the pillar 913 through the insulating materials 916 in the first direction. In an embodiment, the pillar 913 may be formed using a first etch stop process Etch stop1 and a second etch stop process Etch stop2. In this case, reliability of a third memory cell and a fourth memory cell, which are memory cells disposed near a boundary line BLine may be degraded. The inventive concept may be applied to a word line or a bit line including the third memory cell or the fourth memory cell to improve the reliability problem.

Figure 22:
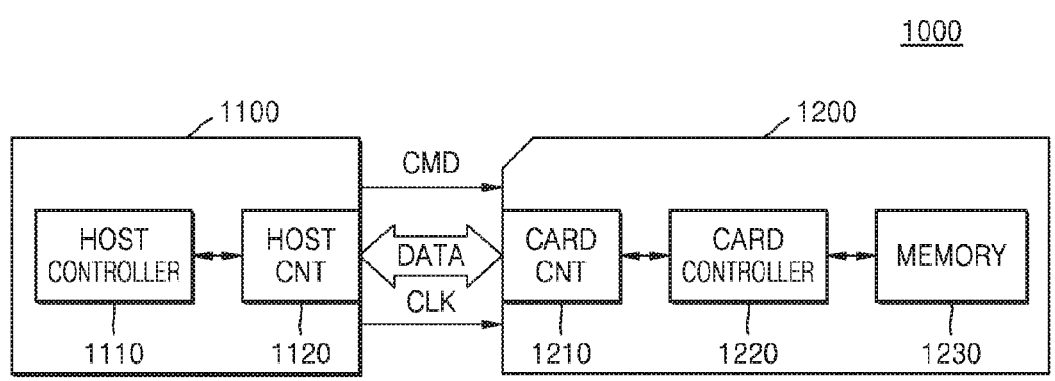
FIG. 22 illustrates a block diagram of an example in which a memory system according to exemplary embodiments of the inventive concept may be applied to a memory card system.

FIG. 22 illustrates a block diagram of a memory card system 1000 to which a memory system according to exemplary embodiments of the inventive concept is applied.

Referring to FIG. 22, the memory card system 1000 includes a host 1100 and a memory card 1200. The host 1100 includes a host controller 1110 and a host connector 1120. The memory card 1200 includes a card connector 1210, a card host controller 1220, and a memory device 1230. In this case, the memory card 1200 may be embodied using the embodiments shown in FIG. 1.

The host 1100 may write data to the memory card 1200 or read data from the memory card 1200. The host controller 1110 may transmit a command CMD, a clock signal CLK generated by a clock generator (not shown) included in the host 1100, and data DATA through the host connector 1120 to the memory card 1200.

The card host controller 1220 may store data in the memory device 1230 in synchronization with the clock signal CLK generated by a clock generator (not shown) included in the card host controller 1220, in response to a command received through the card connector 1210. The memory device 1230 may store data transmitted by the host 1100.

The memory card 1200 may be embodied by a compact flash card (CFC), a microdrive, a smart media card (SMC), a multimedia card (MMC), a secure digital card (SDC), a memory stick, and/or a USB flash memory driver, or the like.

Figure 23:
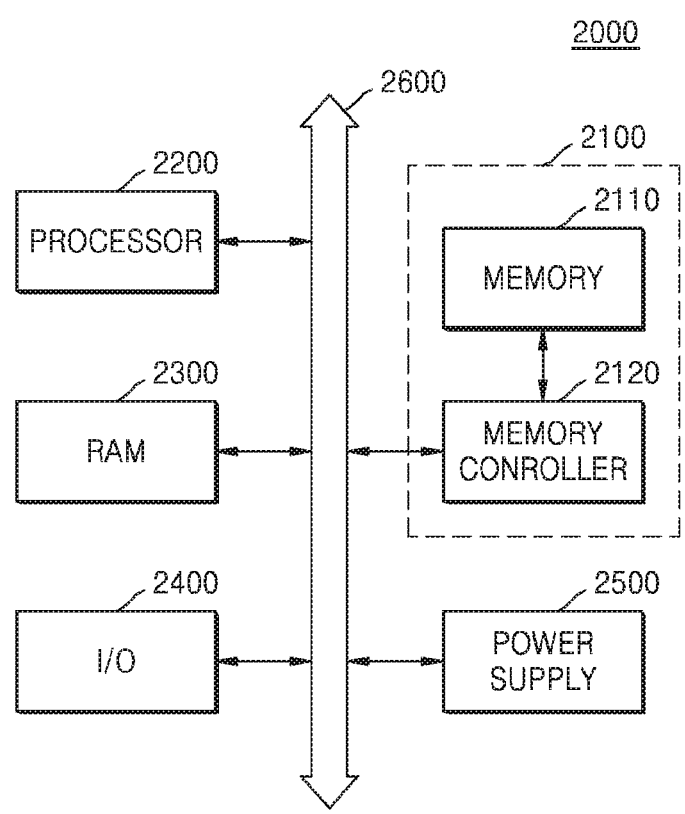
FIG. 23 illustrates a block diagram of a computing system including a memory system according to exemplary embodiments of the inventive concept.

FIG. 23 illustrates a block diagram of a computing system 2000 including a memory system according to exemplary embodiments of the inventive concept.

Referring to FIG. 23, the computing system 2000 includes a memory system 2100, a processor 2200, a random access memory (RAM) 2300, an input/output (I/O) device 2400, and a power supply 2500. Memory system 2100 includes memory controller 2120 and memory device 2110. Although not shown in FIG. 23, the computing system 2000 may communicate with a video card, a sound card, a memory card, and a USB device, or further include ports capable of communicating with other electronic devices. The computing system 2000 may be embodied by a personal computer (PC) or a portable electronic device, such as a laptop computer, a portable phone, a personal digital assistant (PDA), and a camera.

The processor 2200 may make calculations or perform tasks. In some embodiments, the processor 2200 may be a microprocessor (MP) or a central processing unit (CPU). The processor 2200 may communicate with the RAM 2300, the I/O device 2400, and the memory system 2100 through a bus 2600, such as an address bus, a control bus, and a data bus. In this case, the memory system 2100 may be embodied using the embodiments shown in FIG. 1.

In some embodiments, the processor 2200 may be connected to an expansion bus, such as a peripheral component interconnect (PCI) bus.

The RAM 2300 may store data required for an operation of the computing system 2000. For example, the RAM 2300 may be dynamic RAM (DRAM), mobile DRAM, static RAM (SRAM), phase-change RAM (PRAM), ferroelectric RAM (FRAM), resistive RAM (RRAM), and/or magnetic RAM (MRAM), or the like.

The I/O device 2400 may include an input unit, such as a keyboard, a keypad, or a mouse, and an output unit, such as a printer or a display. The power supply 2500 may supply an operating voltage required for an operation of the computing system 2000.

Figure 24:
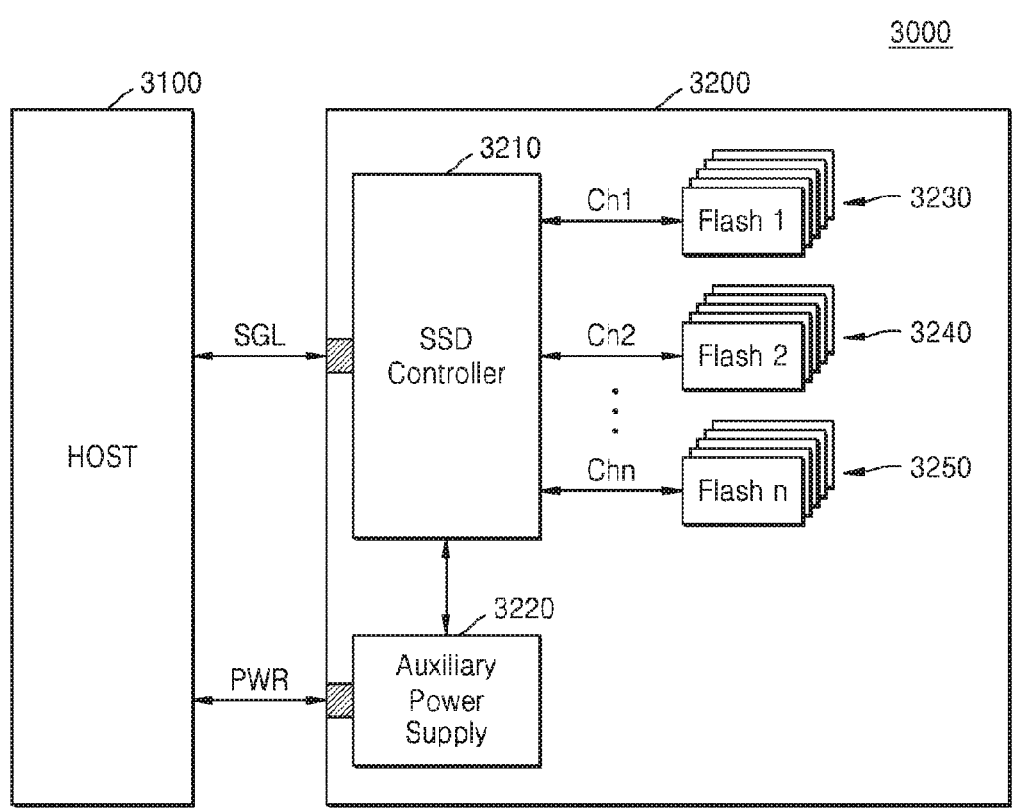
FIG. 24 illustrates a block diagram of an example in which a memory system according to exemplary embodiments of the inventive concept may be applied to a solid-state drive (SSD) system.

FIG. 24 illustrates a block diagram of a solid-state drive (SSD) system 3000 to which a memory system according to exemplary embodiments of the inventive concept is applied.

Referring to FIG. 24, the SSD system 3000 includes a host 3100 and an SSD 3200. The SSD 3200 may exchange signals with the host 3100 through a signal connector, and receive power through a power connector. The SSD 3200 includes an SSD host controller 3210, an auxiliary power supply 3220, and a plurality of memory devices 3230, 3240, and 3250 which are respectively connected to SSD host controller 3210 through channels Ch1, Ch2 and Chn. In this case, the SSD 3200 may be embodied using the embodiments shown in FIG. 1.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

While the inventive concept has been particularly shown and described with reference to exemplary embodiments thereof, it will be understood that various changes in form and details may be made therein without departing from the spirit and scope of the following claims.

What is claimed is:

1. A method of operating a memory system including a memory block having a first sub-block having first word lines and a second sub-block having second word lines, the method comprising:
performing a first program operation on first memory cells connected to at least one of the first word lines of the first sub-block using a first program method, wherein the first program method is configured to program each of the first memory cells to have a first number of bits;
performing a first erase operation on the first sub-block;
detecting a state of distribution of threshold voltages of second memory cells connected to at least one of the second word lines of the second sub-block;
determining whether a second program operation is to be performed on adjacent second memory cells among the second memory cells using a second program method based on the detected state of distribution of threshold voltages, wherein the adjacent second memory cells are connected to adjacent second word lines among the second word lines including at least one second word line adjacent to the first sub-block; and
programming the adjacent second memory cells connected to the adjacent second word lines using the second program method in response to determining that the second program operation is to be performed, wherein
the second program method is configured to program each of the adjacent second memory cells connected to the adjacent second word lines to have a second number of bits.

2. The method of claim 1, wherein the first number of bits is more than the second number of bits.

3. The method of claim 1, further comprising performing a third program operation on adjacent first memory cells among the first memory cells using the second program method, wherein the adjacent first memory cells are connected to adjacent first word lines among the first word lines including at least one first word line adjacent to the second sub-block.

4. The method of claim 1, further comprising performing a second erase operation on the second sub-block after determining whether the second program operation is to be performed on the adjacent second memory cells and before programming the adjacent second memory cells.

5. The method of claim 1, wherein the determining of whether the second program operation is to be performed on the adjacent second memory cells comprises:
applying a detection voltage to the adjacent second memory cells and detecting off-cells having threshold voltages that are higher than the detection voltage from among the adjacent second memory cells; and
setting the second program operation to be performed on the adjacent second memory cells by using the second program method when a number of detected off-cells is less than a reference value.

6. The method of claim 1, wherein the second sub-block further comprises a dummy word line connected to a plurality of memory cells, and at least a portion of the memory cells connected to the dummy word line are programmed only when the adjacent second memory cells connected to the adjacent second word lines are programmed using the second program method.

7. The method of claim 1, wherein:
the first number of bits is equal to the second number of bits, and
the second program method includes boosting threshold voltages of the adjacent second memory cells to be higher than threshold voltages of the first memory cells achieved by the first program method.

8. The method of claim 7, wherein the second program method includes applying a program voltage having a higher voltage level than in the first program method to at least one of the adjacent second memory cells during the second program operation.

9. The method of claim 7, wherein each of the first program method and the second program method is an incremental step pulse (ISPP) method by which a program voltage is gradually increased by as much as a predetermined step voltage.

10. The method of claim 9, wherein in the second program method, at least one of the step voltage and a pulse application time is greater than in the first program method.

11. The method of claim 1, wherein:
the first number of bits is equal to the second number of bits, and
the second program method is any one of a method of programming data after an error correction code (ECC) operation by setting a unit of ECC data to be larger than in the first program method, and a method of programming data after an ECC encoding operation is performed a greater number of times than in the first program method.

* * * * *